US011470443B2

(12) United States Patent
Warren et al.

(10) Patent No.: US 11,470,443 B2
(45) Date of Patent: Oct. 11, 2022

(54) HARVESTING LABELS FOR SIGNIFICANT LOCATIONS BASED ON CANDIDATE POINTS OF INTEREST AND CONTEXTUAL DATA

(71) Applicant: Apple Inc., Cupertino, CA (US)

(72) Inventors: Richard B. Warren, Redwood City, CA (US); Danil Yuryevich Zvyagintsev, Los Gatos, CA (US); Michael P. Dal Santo, San Francisco, CA (US); Liviu T. Popescu, Sunnyvale, CA (US); Pejman Lotfali Kazemi, Sunnyvale, CA (US); Hyo Jeong Shin, Santa Clara, CA (US); Zehua Zhou, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 117 days.

(21) Appl. No.: 16/672,370

(22) Filed: Nov. 1, 2019

(65) Prior Publication Data
US 2020/0068347 A1 Feb. 27, 2020

Related U.S. Application Data

(63) Continuation of application No. 15/713,541, filed on Sep. 22, 2017, now Pat. No. 10,506,373, and a (Continued)

(51) Int. Cl.
G06F 16/29 (2019.01)
G06F 16/9537 (2019.01)
(Continued)

(52) U.S. Cl.
CPC ...... H04W 4/023 (2013.01); G06F 16/24578 (2019.01); G06F 16/29 (2019.01);
(Continued)

(58) Field of Classification Search
None
See application file for complete search history.

(56) References Cited

U.S. PATENT DOCUMENTS 2,999,241 A * 9/1961 Starr ................. B25C 5/16
227/126
3,050,690 A1 11/2011 Neeraj
(Continued)

FOREIGN PATENT DOCUMENTS

WO WO 2016083937 6/2016

Primary Examiner — Idowu O Osifade
(74) Attorney, Agent, or Firm — Aikin & Gallant, LLP

(57) ABSTRACT

In an example method, a computer system receives a query from a mobile device, including an indication of a location of the mobile device, and an environmental measurement obtained by the mobile device at the location. A set of candidate points of interest in geographical proximity to the location is determined. For each of one or more candidate points of interest of the set, a location fingerprint of the candidate point of interest and contextual data regarding the candidate point of interest are obtained. A similarity between the environmental measurement and each location fingerprint is determined. A particular candidate point of interest is selected from among the set based on the similarity, and based on an assessment of the contextual data. A label of the selected point of interest is associated with the location and transmitted to the mobile device.

20 Claims, 19 Drawing Sheets

Related U.S. Application Data continuation-in-part of application No. 15/285,387, filed on Oct. 4, 2016, now Pat. No. 10,070,261, and a continuation-in-part of application No. 15/272,282, filed on Sep. 21, 2016, now Pat. No. 10,739,159, which is a continuation of application No. 62/348,586, filed on Jun. 10, 2016.

(60) Provisional application No. 62/514,721, filed on Jun. 2, 2017.

(51) Int. Cl.
  *G06F 16/2457* (2019.01)
  *H04W 4/02* (2018.01)
  *H04W 4/021* (2018.01)

(52) U.S. Cl.
  CPC ........ *G06F 16/9537* (2019.01); *H04W 4/021* (2013.01); *H04W 4/025* (2013.01)

(56) References Cited

U.S. PATENT DOCUMENTS

| | | | |
|---|---|---|---|
| 8,756,011 B2 | 6/2014 | Vengroff et al. | |
| 9,076,009 B2 | 7/2015 | Sathish et al. | |
| 9,113,293 B1 | 8/2015 | Rayburn et al. | |
| 9,167,386 B2 | 10/2015 | Valaee et al. | |
| 10,070,261 B2 | 9/2018 | Dal Santo et al. | |
| 10,356,559 B2 | 7/2019 | Dal Santo et al. | |
| 10,506,373 B2 | 12/2019 | Warren et al. | |
| 10,739,159 B2 | 8/2020 | Dal Santo et al. | |
| 2007/0130153 A1 | 6/2007 | Nachman et al. | |
| 2008/0147311 A1 | 6/2008 | Zoller et al. | |
| 2008/0147461 A1 | 6/2008 | Lee et al. | |
| 2011/0039517 A1 | 2/2011 | Wigren et al. | |
| 2011/0046881 A1 | 2/2011 | Karaoguz | |
| 2012/0170560 A1* | 7/2012 | Han | H04W 64/00 370/338 |
| 2012/0192252 A1* | 7/2012 | Kuo | H04L 65/1069 726/4 |
| 2012/0301736 A1 | 11/2012 | Huraux et al. | |
| 2012/0310736 A1 | 12/2012 | Vengroff et al. | |
| 2013/0252638 A1 | 9/2013 | Yang et al. | |
| 2013/0262479 A1 | 10/2013 | Liang et al. | |
| 2013/0321402 A1 | 12/2013 | Moore et al. | |
| 2013/0339383 A1 | 12/2013 | Song et al. | |
| 2014/0213294 A1 | 7/2014 | Marti et al. | |
| 2014/0329538 A1 | 11/2014 | Zhang et al. | |
| 2014/0365459 A1 | 12/2014 | Clark et al. | |
| 2014/0365913 A1 | 12/2014 | Santamaria et al. | |
| 2015/0350842 A1 | 12/2015 | Huang et al. | |
| 2015/0371087 A1* | 12/2015 | Ross | G06K 9/3233 382/219 |
| 2016/0350811 A1* | 12/2016 | Perttunen | G06Q 30/0267 |
| 2017/0006430 A1 | 1/2017 | Chao et al. | |
| 2017/0357381 A1 | 12/2017 | Dal Santo et al. | |
| 2018/0014161 A1 | 1/2018 | Warren et al. | |
| 2018/0098196 A1 | 4/2018 | Dal Santo et al. | |
| 2018/0376286 A1 | 12/2018 | Dal Santo et al. | |

\* cited by examiner

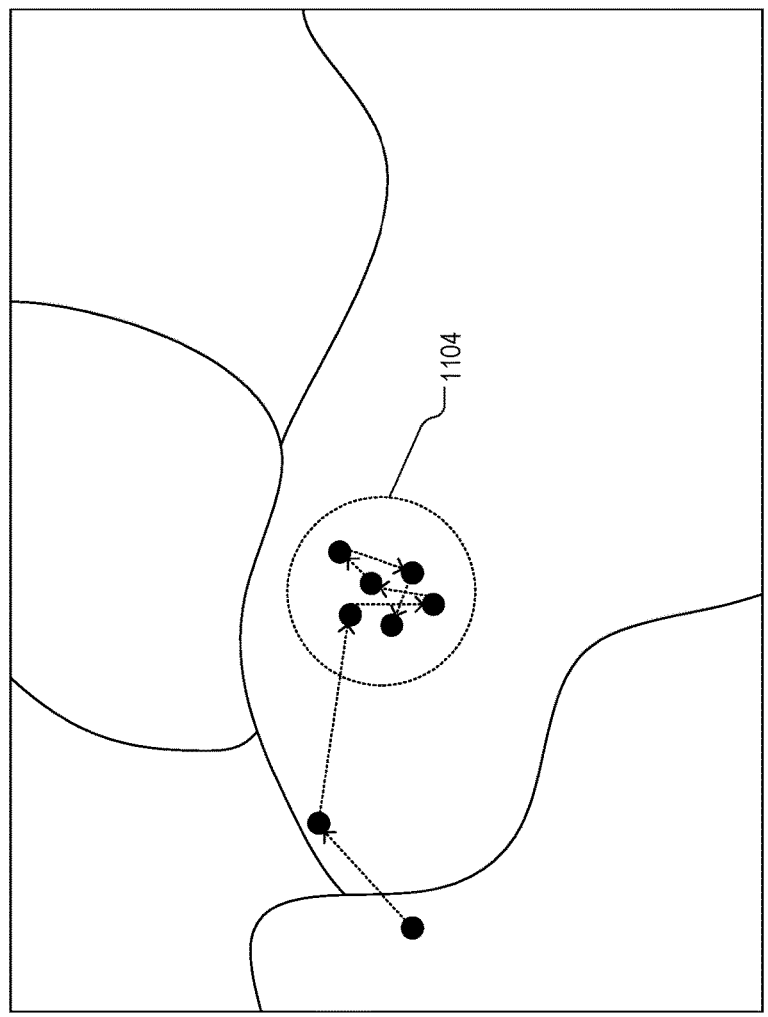
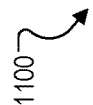
FIG. 11B

HARVESTING LABELS FOR SIGNIFICANT LOCATIONS BASED ON CANDIDATE POINTS OF INTEREST AND CONTEXTUAL DATA

CROSS-REFERENCE TO RELATED APPLICATIONS

This application is a continuation of U.S. patent application Ser. No. 15/713,541 filed Sep. 22, 2017, which claims priority to U.S. Provisional Patent Application No. 62/514,721, filed Jun. 2, 2017, and which is also a continuation-in-part of U.S. patent application Ser. No. 15/285,387, filed Oct. 4, 2016, and is a continuation-in-part of U.S. patent application Ser. No. 15/272,282, filed Sep. 21, 2016, which claims priority to U.S. Provisional Patent Application No. 62/348,586, filed Jun. 10, 2016. The entire contents of each of the aforementioned applications are incorporated herein by reference.

TECHNICAL FIELD

This disclosure relates generally to location-based services.

BACKGROUND

A map service can provide maps to one or more computing devices. The maps can include points of interest (POIs). A POI can be a place that is designated as useful or of interest to any user or all users. For example, a POI can be a shop, restaurant, or a hotel. Each POI may have an address (for example, a street address). To display a POI in a map, the map service can geocode the POI by associating a location (for example, latitude and longitude coordinates) with the POI. The online map service can display a marker representing the POI on the map at the latitude and longitude coordinates. The inverse technique, reverse geocoding, attempts to determine a POI to which a given latitude and longitude refers.

SUMMARY

This disclosure describes embodiments for harvesting and serving labels for locations.

In an aspect, a method includes receiving, at a computer system, a query from a mobile device. The query includes an indication of a location of the mobile device, and an environmental measurement obtained by the mobile device at the location. The method also includes determining a set of candidate points of interest in geographical proximity to the location, and obtaining, for each of one or more candidate points of interest of the set, a location fingerprint of the candidate point of interest and contextual data regarding the candidate point of interest. The method also includes determining a similarity between the environmental measurement and each location fingerprint, and selecting a particular candidate point of interest from among the set. The particular candidate point of interest is selected based on the similarity between the environmental measurement and each location fingerprint, and based on an assessment of the contextual data. The method also includes associating a label of the selected point of interest with the location, and transmitting, to the mobile device, the label of the selected point of interest.

The method of claim 1, wherein determining the set of candidate points of interest in geographical proximity to the location comprises determining one or more points of interest within a radius r of the location.

Implementations can include one or more of the following features.

In some implementations, the radius r can be determined based on an accuracy or a reliability of the location provided by the mobile device.

In some implementations, the contextual data regarding the candidate point of interest can include at least one of an hours of operation of the candidate point of interest, a days of operation of the candidate point of interest, a popularity of the candidate point of interest, or a favorability of the candidate point of interest.

In some implementations, selecting the particular candidate point of interest from among the set can include determining, for each candidate point of interest of the set, a respective likelihood score. Each likelihood score can represent a likelihood that the location corresponds to the candidate point of interest.

In some implementations, determining, for each candidate point of interest, the respective likelihood score can include calculating an initial likelihood score based on a similarity between the environment measurement and the location fingerprint of the candidate point of interest, and subsequent to calculating the initial likelihood score, modifying the initial likelihood score based on the contextual data of the candidate point of interest.

In some implementations, determining, for each candidate point of interest, the respective likelihood score further can include determining a particular candidate point of interest of the set not associated with a location fingerprint, and calculating an initial likelihood score for that candidate point of interest based on an interpolation of one or more likelihood scores for one or more other candidate points of interest of the set.

In some implementations, the method can further include identifying one or more additional candidate points of interest based on the likelihood scores. Identifying one or more additional candidate points of interest can include determining an additional point of interest not associated with a location fingerprint and in geographical proximity to the location, determining that the additional point of interest is within a threshold distance of a candidate point of interest of the set having a likelihood score greater than a threshold likelihood value, and including the additional point of interest in the set.

In some implementations, the location can correspond to a cluster of ordered locations of the mobile device.

In some implementations, the method can further include modifying the location fingerprint of the selected point of interest based on the environment measurement.

In some implementations, the method can further include modifying a boundary of the selected point of interest based on the similarity between the environment measurement and the location fingerprint of the selected point of interest and the contextual data of the selected point of interest.

In some implementations, each locational fingerprint can include measurement data regarding one or more wireless signals measured at a respective candidate point of interest.

In some implementations, the measurement data can include indications of one or more wireless access points previously detected at the respective candidate point of interest, and an indication of a signal strength associated with each wireless access point.

In some implementations, the method can further include determining, at the mobile device, a device-specific label of the location based on a plurality of labeling criteria, the labeling criteria comprising the label transmitted by the computer system.

In some implementations, the plurality of labeling criteria can further include at least one of contact information associated with a user of the mobile device, a search history associated with the user, a location history associated with the user, geocoded information, a transaction history associated with the user, and messages transmitted to the user by one or more other users and/or received by the user from one or other users.

In some implementations, determining the device-specific label of the location can include assigning a respective weight to each criterion of the labeling criteria.

In some implementations, determining the device-specific label of the location at the mobile device can include determining one or more additional labels based on the plurality of labeling criteria, and determining a score for the label transmitted by the computer system and each additional label based on the weights.

Other implementations are directed to systems, devices and non-transitory, computer-readable mediums.

Particular embodiments disclosed herein provide one or more advantages. For example, the harvesting of location labels allows for the creation of a network-based service for client computing devices that do not have labeled data for a significant location. The harvested data is uploaded anonymously meaning that the harvested data does not include information that identifies the user of the client computing device being harvested. Additionally, the user may opt out of the harvesting using, for example, a setting pane or menu implemented on the computing device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 11A-11C show an example process of fulfilling requests for location labels.

Like reference numbers and designations in the various drawings indicate like elements.

DETAILED DESCRIPTION

Exemplary Use Cases

Figure 1:
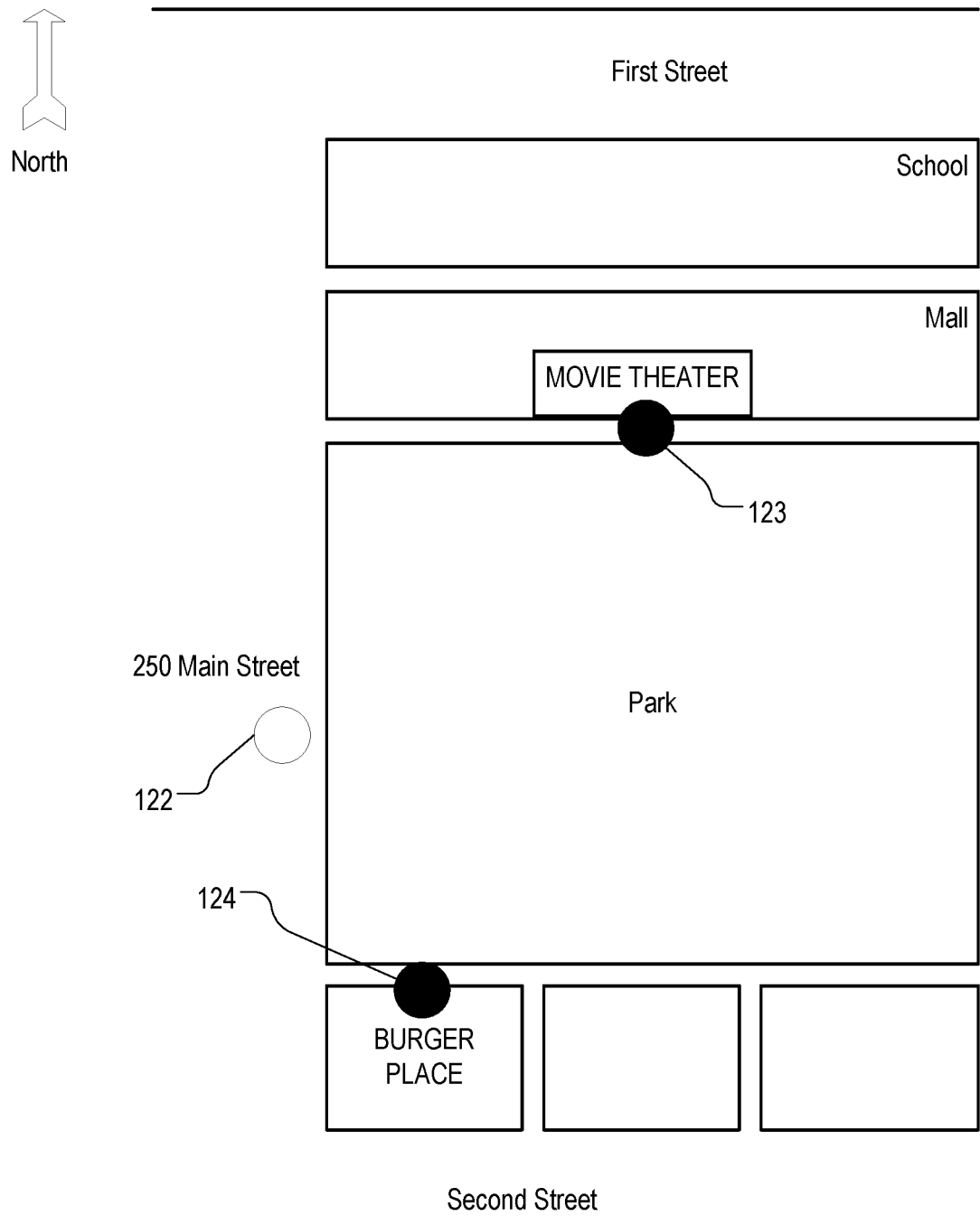
FIG. 1 is a schematic diagram of an example virtual map presented by a computing device showing POIs and a significant location.

FIG. 1 is a schematic diagram of an example map presented on a display of a computing device. In the example shown, the computing device (e.g., a smartphone, tablet computer, wearable device, desktop computer or other computing device) executes a map application that displays a map of a geographic area including three streets: Main Street (going north-south), and cross streets First Street and Second Street, each going east-west. The map application overlays on the map POI markers 123, 124 representing a "MOVIE THEATER" and a "BURGER PLACE," respectively. In general, a POI can be a business, landmark, public park, school or any other entity that is of interest to or is meaningful to a user, a subset of users, or all users.

In addition to POI markers 123, 124, the map application also displays a marker 122 representing a location of the computing device. In some instances, the location of the computing device can be any geographic location at which the computing device is physically located. In an example in which the computing device is a smartphone, a wearable device (for example, a smartwatch), or an automobile information and entertainment center, the marker 122 can be displayed at a location of a user possessing the computing device. In some instances, the location of the computing device can be a location that is significant to the user of the computing device. For example, a significant location can be the user's home or work address or a location that the user has visited several times in the past (e.g., a frequently visited business).

Determining that a location is a significant location can include determining that the computing device dwells at the significant location for at least a threshold amount of time. As described below, the significant location can be inferred from clusters of latitude and longitude readings from, for example, satellite-based or terrestrial-based positioning technologies, such as a Global Navigation Satellite System (GNSS) receiver, which were gathered previously. As such, the significant location may have associated geographic uncertainty—that is, its boundaries may not be precisely known. The associations between its cluster of latitude and longitude readings and one or more POIs may also not be known.

Therefore, a significant location may be represented by a marker on the map with a label that is not meaningful to the user. For example, a significant location for the user may be a frequently visited restaurant, such as BURGER PLACE 124. The user would expect to see the significant location marker 122 located at, for example, the entrance to BURGER PLACE 124 with an appropriate label describing the restaurant. However, since significant locations are estimated (e.g., using a classifier or machine learning), the location marker 122 is in the middle of Main Street with a generic label (e.g., only a street address) that has no meaning to the user. This results in a poor user experience with the map application. By labeling the geographic location 122 with a label that is meaningful to the user (e.g., "BURGER PLACE"), the map application personalizes the significant location to the user, thereby enhancing the user's experience with the map application.

Implementations of the subject matter described in this disclosure can enhance operation of a computing device by using contextual data stored on or accessible by the computing device to improve the usefulness of significant locations to a user. Contextual data can include data unique to the computing device or personalized for a user of the computing device (or both). The contextual data can include data collected based on the user's usage of the computing device, for example, based on executing, using the computing device, one or more applications that the computing device is configured to execute.

In some implementations, the contextual data collected based on usage of the computing device can include any input provided to the computing device to execute any application. The input can be expressly provided by the user or can be inherently obtained in response to the user performing an action. The contextual data can include any output provided by the computing device either in response to any input or in response to executing any application.

The contextual data can include any information derived or inferred by the computing device based on usage (present or past usage or both) of the computing device, in an environment in which the computing device is or was present, based on information received from the computing device from a source other than the user (for example, a central server, a Wi-Fi service provider, a telephony service provider, or other source) or any combination of them. For example, by leveraging contextual data that is already being collected for other applications running on the computing device to label significant locations, the utility of significant locations to the user is improved without expending additional resources to collect or derive additional data. This results in an improvement to the computing device by preserving memory and storage and reducing power consumption by the computing device by not performing additional data collection and processing.

Exemplary Labeling of Significant Locations Based on Contextual Data

Figure 2A:
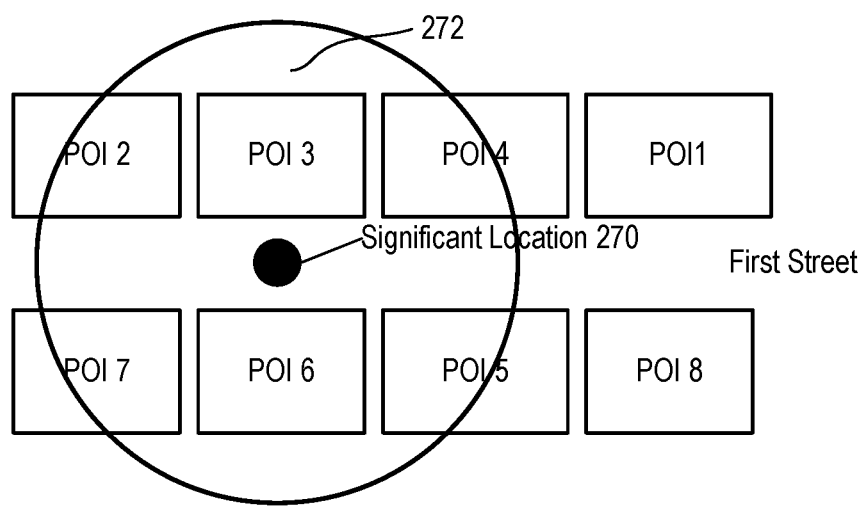
FIG. 2A is a schematic diagram illustrating multiple points of interest near a significant location.

FIG. 2A is a schematic diagram illustrating POIs near a significant location 270. The schematic diagram illustrates that multiple POIs can fall within an uncertainty associated with a significant location. In the example shown, the significant location 270 is located among 8 POIs (POI 1-POI 8). The uncertainty associated with the significant location 270 defines a geographic area of uncertainty 272 that encompasses a subset of the POIs (for example, POIs 2, 3, 4, 5, 6, and 7). In some implementations, the computing device 200 can store or derive contextual data associated with at least one of the subset of the POIs encompassed by the geographic area of uncertainty 272. For example, the user of the computing device 200 may have executed a payment transaction using the computing device 200 at POI 3. Contextual details associated with the payment transaction (e.g., timestamp, merchant name and address, or other business identifier) can be stored on the computing device 200 during the transaction. The contextual details associated with payment transactions can further show that the user has not executed a payment transaction at any of the other POIs in the subset of POIs over a specified time period.

In another example, a disambiguation based on crowd-sourced payment history can be used to identify POI 3. For example, several users of respective computing devices may have executed respective payment transaction using their respective computing devices at POI 3. Contextual details associated with each payment transaction (e.g., timestamp, merchant name and address, or other business identifier) can be stored on respective computing devices during respective transactions. The contextual details associated with payment transactions can further show that some or all the users have not executed payment transactions at any of the other POIs in the subset of POIs over a specified time period.

In a further example, the user of the computing device 200 may have frequented POI 3 multiple times over a duration (for example, a week, a month). The computing device 200 can store a dwell time of the computing device 200 at POI 3 or a map route to the POI 3. The number of visits can be tracked with a software counter. The dwell time can be determined from a motion sensor (e.g., accelerometer) or GNSS receiver on the computing device 200 and a timer. Based on such contextual details (or other contextual details such as those described below), the computing device 200 can determine that, out of all the POIs in the subset, POI 3 is most likely to be the significant location. For example, based on multiple visits to the same geographic location and multiple payment transactions at POI 3 during each of those visits, the computing device 200 can determine that POI 3 is most likely to be the significant location. The maps engine 206 can identify a label (e.g., a merchant name) associated with POI 3. For example, the label can be stored in the POI database 210. The identified label is meaningful to the user of the computing device 200 because the user has visited POI 3 one or more times in the past.

Figure 2B:
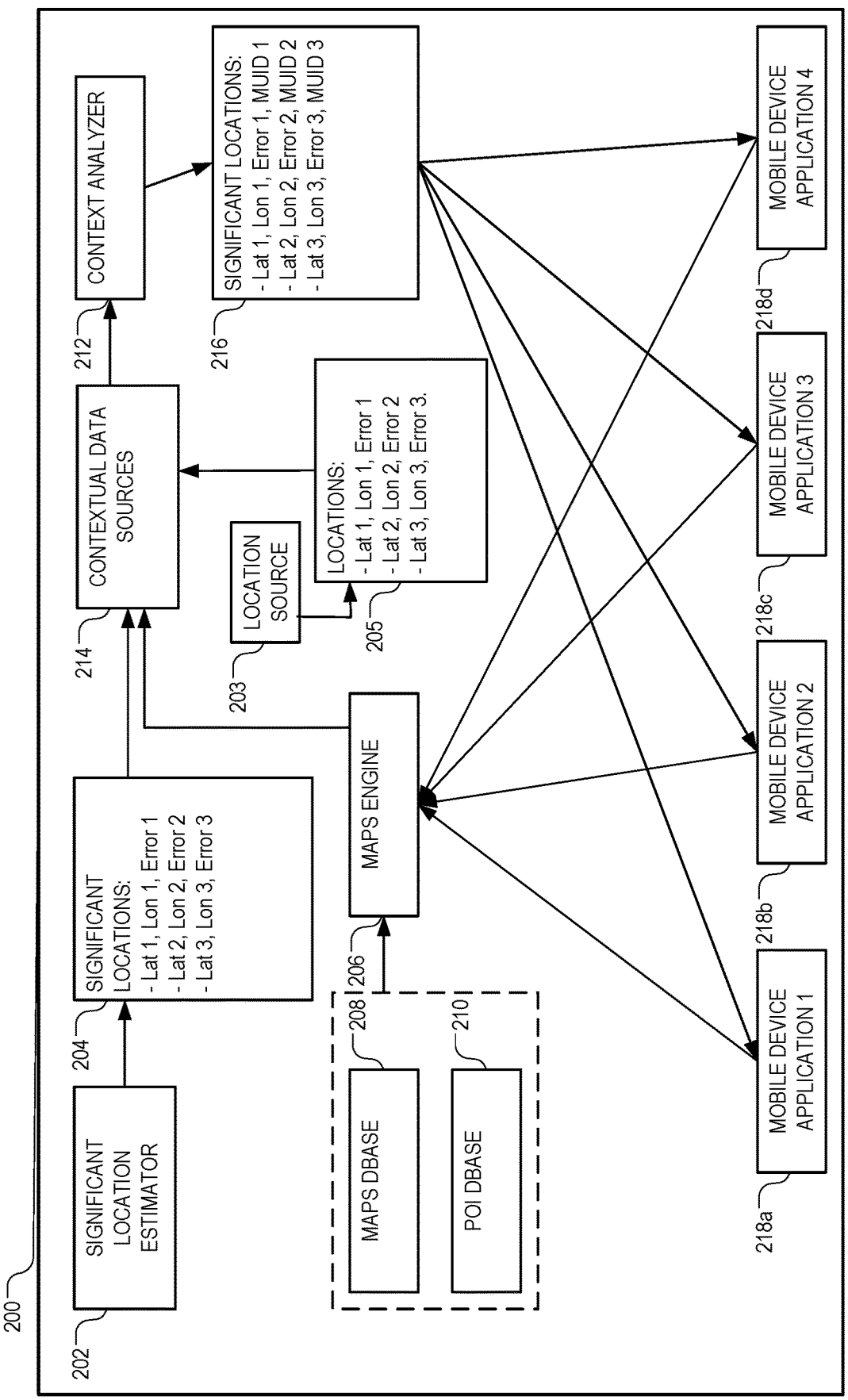
FIG. 2B is a block diagram illustrating components of an example system for implementing labeling of significant locations based on contextual data.

FIG. 2B is a block diagram illustrating components of an exemplary computing device 200 implementing labeling of locations, for example, significant locations or any location, based on contextual data associated with or stored on (or both) the computing device. Returning to the example described above with reference to FIG. 2A, by implementing the techniques described below with reference to FIG. 2B, the location of the computing device 200 can be resolved to POI 3 from among the subset of POIs, namely, POIs 2, 3, 4, 5, 6, and 7. The computing device 200 can include one or more processors and a computer-readable storage medium storing instructions executable by the one or more processors to perform operations described herein. Additional details about the computing device 200 architecture are described below with reference to FIG. 5. The computing device 200 includes multiple components (for example, multiple modules), each of which can be implemented as computer instructions executable by the one or more processors, as described in reference to FIG. 5.

In some implementations, the computing device 200 includes a significant location estimator 202. The significant location estimator 202 can output significant locations 204. Each significant location can be associated with an entity POI that is located at a geographic location. Each POI is assumed to have meaning to any user of any computing device or all users of respective computing devices. For example, a significant location can include the user's home or work place or other location that the user of the computing device frequently visits. For example, a significant location can include a business such as the user's favorite restaurants, movie theaters, or other shops.

In some implementations, the computing device 200 includes a location source 203 that can output locations 205. Each location output by the location source 203 can be associated with a POI that is located at a geographic location. A location output by the location source 203 may or may not have significance to the user of the computing device. Therefore, a location output by the location source 203 may overlap with a location output by the significant location estimator 202.

In some implementations, each location (e.g., location output by the significant location estimator 202 or the location source 203) can be represented by an estimated geographic location and data representing a measure of uncertainty or error in the estimated location. The geographic location can be identified by position coordinates in any reference coordinate frame such as a geodetic or East North Up (ENU) reference coordinate frame. In an implementation, the geographic location is represented by latitude, longitude, and altitude. The uncertainty or error can be a statistical variance associated with the estimated significant location. In an implementation, the error can be represented on a map as a geographic area (e.g., a circle or other polygon) surrounding the estimated significant location. The exact location of the significant location can be anywhere within the geographic area. In some implementations, the significant location estimator 202 and the location source 203 can generate, output, and store a list of significant locations 204 and a list of locations 205, respectively. Over time, the significant location estimator 202 can update the list, for example, by adding more significant locations or removing locations that are no longer significant (e.g., locations that have not been visited for a long period of time). In an implementation, the list is an ordered list with the significant location at the top of the list having the lowest uncertainty or error. Similarly, over time, the locations in the location source 203 can also be updated.

The computing device 200 can include a maps engine 206 connected to a maps database 208 and a POI database 210. The maps engine 206 is also accessible by computing device applications 218a-218d through, for example an application programming interface (API). The computing device applications 218a-218d can request map data from maps engine 206 that can be rendered into a map. In an implementation, the maps database 208 and POI database 210 can be a single database. The maps database 208 maintains map data for generating a map including data for rendering streets, highways, freeways, and the like on the map. The POI database 210 maintains a list of entities (e.g., businesses, public landmarks, parks, schools, hospitals) that can be represented by markers (e.g., virtual pushpins) overlaid on the map. For example, the maps database 208 can store a street address of an entity and the POI database 210 can store information identifying the entity as a particular restaurant, which can serve as the label for the entity. In particular, POI database 210 can store one or more labels for each of the entities. The one or more labels can include, for example, a business name of an entity provided by a POI service, a tag entered by a user for the entity, or a contact name associated with the entity in a contact list (e.g., a home or work address). The maps database 208 and the POI database 210 can provide the list of entities and their identities to the maps engine 206. The maps engine 206 can display markers representing the significant locations in the map together with the markers for the POIs.

The computing device 200 includes a context analyzer 212 configured to collect and analyze contextual data to identify a label for a location (e.g., a location output by the significant location estimator 202 or a location output by the location source 203) at or near which the computing device is located. In some implementations, a location process in the computing device 200 can obtain (e.g., receive or estimate) a geographic location of the computing device 200. For example, the location processor can receive or derive the geographic location of the computing device from signals transmitted by a terrestrial-based or satellite-based location estimation system, such as, for example, a Wi-Fi station, cell tower, or GNSS. An example GNSS system is the Global Positioning System (GPS). The geographic location of the computing device can be represented by a latitude, longitude, and altitude. The estimated geographic location of the computing device can also include an uncertainty, which can be represented by a geographic area (e.g., circular region or other polygon) surrounding the estimated geographic location of the computing device. In some implementations, the context analyzer 212 can generate and output a list of significant locations 204 that includes, for each significant location, location information (for example, latitude or longitude or altitude or any combination of them, and an uncertainty) and a maps unique identifier (MUID) (described below).

The maps engine 206 can obtain POIs associated with, for example, near a significant location. As described earlier, each POI represents an entity within or near a geographic area of uncertainty surrounding the estimated significant location. For example, the maps engine 206 can provide the POIs, which are stored in the POI database 210 or retrieved from a network-based POI service if available. The geographic locations of the POIs can reside inside or outside the geographic area of uncertainty associated with the estimated significant location. The maps engine 206 can determine that at least one of the POIs is a significant location by comparing the geographic locations of the POIs with the geographic locations of the significant locations in the list of significant locations 204 provided by the significant location estimator 202. If a significant location is the same as a POI location, then the significant location can be replaced by the POI or can assume the label of the matching POI. If, however, there is no match, the context analyzer 212 can determine that one of the POIs is a significant location based on contextual data associated with the POIs, as described with reference to FIG. 2B.

Figure 3A:
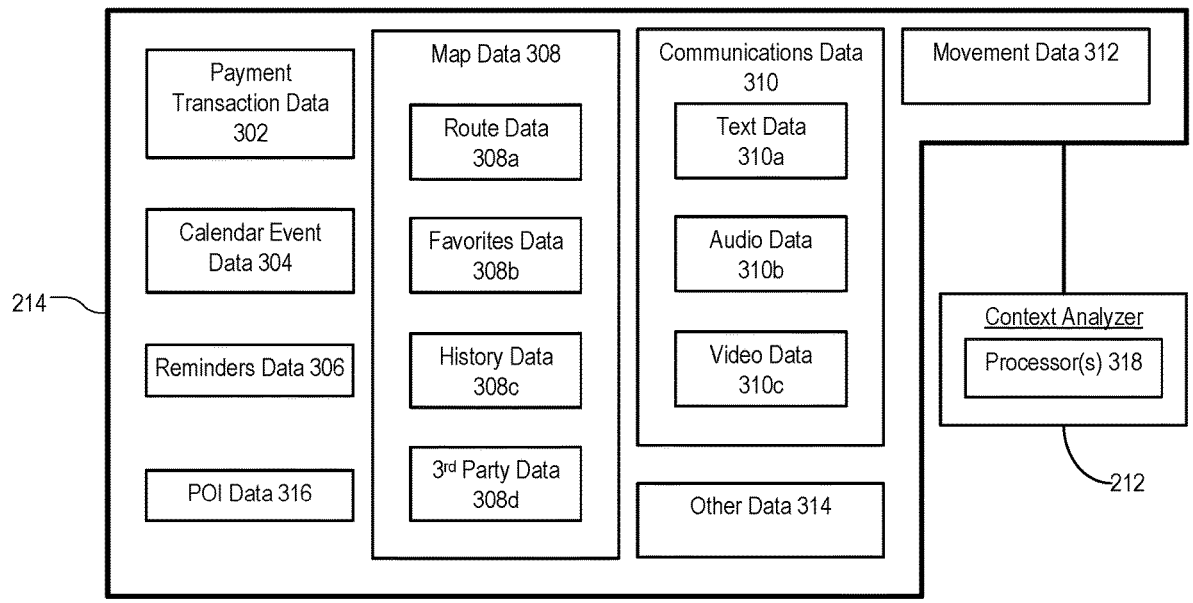
FIG. 3A is a block diagram illustrating contextual data sources used to identify labels for significant locations.

FIG. 3A is a block diagram illustrating contextual data sources 214 used to identify labels for significant locations. The contextual data sources 214 can include multiple components, each storing contextual data which the context analyzer 212 can use to identify a label associated with a significant location (e.g., using one or more processors 318). Several examples of contextual data for identifying labels associated with significant locations are described below. If the label is associated with a POI in the POI database 210, the POI can be associated with a POI identifier or a map unique identifier (MUID). When a computing device application 218a-218d running on the computing device 200 requests a significant location that can be mapped to a nearby POI, the MUID for the POI can be provided to the requesting application. The requesting application can then send the MUID to the maps engine 206 (e.g., through an API), which can be used by the maps engine 206 to retrieve the label from the POI database 210.

In the examples for identifying a label described below, an identified label is described as being displayed in a user interface. In some implementations, a confidence level for the identified label can be determined and displayed in the user interface together with the label. The confidence level can represent a likelihood that the identified label matches the accurate label of the significant location. For example, the confidence level can be indicated by a marker (for example, by presenting a question mark next to the label or by presenting the label in a particular color or other marker). The marker can be editable allowing a user to either confirm that the identified label is accurate or to correct the label. A correction to a label can include re-labeling the displayed label to be the accurate label. Alternatively or in addition, the correction can include labeling a different, more accurate significant location with the identified label. In response to the user editing the label, the edit is applied to other appearances of the same significant location and when the computing device is located at the significant location at a future time.

Identifying a Label Based on Payment Transaction

In some implementations, computing device 200 can determine a label for a significant location based on payment transaction data 302 or a history of payment transactions stored by a payment application implemented by the computing device 200. The payment transactions can include a time of the payment transaction, the location of the transaction (e.g., point of sale), and an identity (e.g., merchant name or business identifier) of the significant location at which the payment transaction occurred. In some cases, the significant location can be a POI in the POI database 210. For example, if the user is at a restaurant (labeled "Burger Place") and executes the payment application on the computing device 200 to complete a transaction with the restaurant, then the payment application can store a time of the transaction, the location of the transaction, and the merchant name "Burger Place" as payment transaction data 302. When the significant location estimator 202 provides a significant location, the significant location can be associated with the MUID for "Burger Place" based on the transaction data. A marker for the significant location is displayed on the map with the label "Burger Place." The label "Burger Place" has meaning to the user because the user purchased food at the Burger Place one or more times in the past.

Identifying a Label Based on Calendar Events

In some implementations, computing device 200 can determine a label for a significant location based on calendar event data 304. The contextual data sources 214 can include calendar event data 304 received from a calendar application implemented by the computing device 200. The calendar event data 304 can include a location field with an address or a text string that includes a "hint" of a location. For example, the text string could recite "Dinner at Bob's Summer home in the Hamptons." That text can be used to search a contact or address book for Bob's Summer home address. A label of a significant location that is near Bob's Summer home can be updated with the exact address found in the contact or address book. If there is a populated location field, the address can be taken from the calendar event data 304.

Identifying a Label Based on Reminders

In some implementations, computing device 200 can determine a label for a significant location based on reminders data 306. A reminder is an application that runs on computing device 200 that is configured to notify a user of computing device 200 about pending projects or tasks that need to be completed or tracked. The contextual data sources 214 can include reminders data 306 received from one or more applications implemented by the computing device 200. For example, the reminders data 306 can be received from the calendar application. Alternatively, the reminders data 306 can be received from a notes application executed by the computing device 200 to create and store a note in reply to instructions from the user. For example, in response to the user speaking a voice command, "Remind me to get milk at the grocery store," the computing device 200 can create a reminder with the text spoken by the user. In this example, the reminder mentions the significant location, namely, "the grocery store". The context analyzer 212 can determine that "grocery store" represents a significant location. For example, the context analyzer 212 can determine if any POIs near the significant location is a grocery store and use the POI label for the grocery store to label the significant location with a meaningful label. In some cases, there may be multiple grocery store POIs near the significant location. In these cases, additional contextual data sources 214 can be used to narrow the multiple POIs to a single POI. For example, if the user has visited a particular POI more than others in the past, that contextual data can be used to filter the POIs to a single POI. In another example, transaction data can be used to filter the POIs as described above.

Identifying a Label Based on Map Data

In some implementations, computing device 200 can determine a label for a significant location based on map data. The contextual data sources 214 can include map data 308 received from a map application implemented by the computing device 200, for example, the maps engine 206.

For example, the map data 308 can include route data 308a that stores routes traveled by the computing device 200. The route data 308a can include route information including a destination location. The destination location can be a location that the significant location estimator 202 has previously determined to be a significant location. The context analyzer 212 can determine that the destination location is at or near a POI with an assigned label. Based on this determination, the context analyzer 212 can assign the label of the POI to the significant location and store the label in the route data 308a. In this manner, the context analyzer 212 can use the route data 308a to label the significant location.

In another example, the map data 308 can include favorites data 308b that stores locations identified as "Favorites" by the user of the computing device 200. The locations identified as favorites can be significant locations. One or more of the significant locations, e.g., locations identified as favorites, can also be POIs with respective assigned labels. The context analyzer 212 can determine that a significant location identified as a favorite is also a POI. Based on this determination, the context analyzer 212 can assign the label of the POI to the significant location and store the label in the favorites data 308b.

In a further example, the map data 308 can include history data 308c that stores locations that the user of the computing device 200 viewed using the maps application or that the user viewed and visited. For example, the user can view a significant location in the maps application by selecting a marker on a map representing the significant location to view details and perhaps photos of the significant location.

A location that the user viewed and visited has a higher likelihood of being a significant location than a location that a user only viewed, especially when the user visited the location multiple times. One or more of the significant locations, e.g., locations that the user viewed (or viewed and visited), can also be POIs with respective assigned labels. The context analyzer 212 can determine that a significant location that the user viewed (or viewed and visited) is also a POI. Based on this determination, the context analyzer 212 can assign the label of the POI to the significant location and store the label in the history data 308c.

In another example, the map data 308 can include third party data 308d. The computing device 200 can be configured to implement third party applications, e.g., applications created by parties other than those that developed the computing device 200. Certain third party applications can provide locations to the user of the computing device 200, for example, in response to a search request. An exemplary third party application is one that provides suggestions for restaurants in response to a user searching for restaurants within a geographic area. The maps application can display the geographic location of a restaurant provided by such a third party application. In addition, the maps application can store location information associated with the restaurant including, for example, the geographic location, the restaurant's name or other location information. The computing device 200 can determine that the restaurant provided by the third party application is a significant location, for example, if the user visits the restaurant (one or more times) or if the user frequently views the restaurant using the third party application (or both). In this manner, the computing device 200 can identify multiple significant locations based on usage of the third party application. One or more of the significant locations, e.g., locations that the user viewed (or viewed and visited) using the third party application, can also be POIs with respective assigned labels. The context analyzer 212 can determine that a significant location that the user viewed (or viewed and visited) using the third party application is also a POI. Based on this determination, the context analyzer 212 can assign the label of the POI to the significant location and store the label in the third party data 308d.

In a further example, accessing a POI on a third party application (for example, viewing, browsing or selecting the POI) is, by itself, an indication that the POI is relevant. That is, the POI is relevant even if the map data 308 does not receive the POI from the third party application. In such instances, the POI selected using the third party application can be stored (for example, as "favorite" or "relevant" locations) and be matched against potential POIs at which the computing device 200 can be located.

Identifying a Label Based on Communications Data

In some implementations, computing device 200 can determine a label for a significant location based on communications data. The contextual data sources 214 can include communications data 310 received from a communication application implemented by the computing device 200. For example, the communications data can include communications between the computing device 200 and at least one other computing device. The communication application can be a telephone application, a text message application, an audio communication application, an email application, a digital assistant application, a video communication application, or any other application in which communications are sent from or received by the computing device 200.

For example, the communications data 310 can include text data 310a that stores text messages exchanged between the computing device 200 and at least one other computing device. The text messages can include text that mentions a significant location. The location mentioned in the text message can also be a POI with an assigned label. The context analyzer 212 can extract text from the text message and identify a POI (for example, a business) whose name is the same as or substantially similar to the extracted text. Upon finding a match, e.g., upon determining that a threshold likelihood that the extracted text matches the business name is satisfied, the context analyzer 212 can assign the label of the POI to the significant location and store the label in the text data 310a.

In another example, the communications data 310 can include audio data 310b that stores audio messages exchanged between the computing device 200 and at least one other computing device. The audio messages can include audio exchanged during voice calls, audio included in voicemail messages (either incoming voicemail message or voicemail messages left on other devices using the computing device 200), audio included in other communication applications, or combinations of them. The audio messages can include audio that mentions a significant location. The location mentioned in the audio message can also be a POI with an assigned label. The context analyzer 212 can identify a POI (for example, a business) whose name is the same as or substantially similar to that of a significant location mentioned in the audio message. Upon finding a match, e.g., upon determining that a threshold likelihood that the name in the audio message matches the business name is satisfied, the context analyzer 212 can assign the label of the POI to the significant location and store the label in the audio data 310b.

In a further example, the communications data 310 can include video data 310c that stores video messages (including images, such as video, and audio) exchanged between the computing device 200 and at least one other computing device. The video messages can include images or audio (or both) that mentions a significant location. The location mentioned in the video message can also be a POI with an assigned label. The context analyzer 212 can identify a POI (for example, a business) whose name is the same as or substantially similar to that of a significant location mentioned in the video message. Upon finding a match, e.g., upon determining that a threshold likelihood that the name in the video message matches the business name is satisfied, the context analyzer 212 can assign the label of the POI to the significant location and store the label in the audio data 310b.

In some implementations, the communication data can include a mention of a time or a context based, either or both of which can be used to resolve multiple POIs to a single significant location. For example, the communication data can include the statement "See you at the Burger King around 8 pm" in any format (e.g., audio, video, text or combinations of them). The mention of time—"8 pm"—in the communication can be used to further resolve the significant location at which the computing device is present. In another example, the communication data can include the statement "I will eat sushi tonight at 8 pm." The mention of "sushi" can provide a context indicating that the computing device will be located at a Japanese restaurant at 8 pm. The context, taken alone or in combination with the time, can be used to resolve the significant location at which the computing device is present.

Identifying a Label Based on Movement Data

In some implementations, computing device 200 can determine a label for a significant location based on movement data. The contextual data sources 214 can include movement data 312 received from an inertial sensor, GNSS receiver or digital pedometer application or other movement data source available to the computing device 200. For example, the computing device 200 can determine based on GNSS data that the computing device 200 is at a location in which POIs are aggregated (such as a mall with multiple shops, restaurants and a movie theater). The movement of the computing device 200 can be tracked between the multiple POIs. The context analyzer 212 can identify a label to be assigned to a significant location based on the movement (or lack of movement) of the computing device 200 between the multiple POIs. For example, a dwell time of the computing device 200 when the computing device 200 is at the movie theater is likely to be significantly higher than a dwell time of the computing device 200 when the computing device 200 is elsewhere (such as at a store or a restaurant). Based on the increased dwell time, the context analyzer 212 can determine that the computing device 200 is at the movie theater. The context analyzer 212 can identify a label for the movie theater based on the movie theater having also been designated as a POI, and store the label in movement data 312.

In some implementations, the computing device 200 can include one or more motion sensors (e.g., accelerometer, gyroscope, magnetometer or other motion sensors). Using the motion sensors or other sensors (or both), the context analyzer 212 can determine a type of physical activity being performed by the user of the computing device 200. For example, if the motion sensor indicates oscillation, the speed indicates running and the location of the computing device 200 remains unchanged, then the context analyzer 212 can determine that the user is running on a treadmill. If the context analyzer 212 determines that the potential significant locations at which the computing device 200 can be present can include a gym or a travel agency, the context analyzer 212 can increase a likelihood that the computing device 200 is at the gym, not the travel agency, based on motion information sensed by the motion sensors or other sensors.

In some implementations, the computing device 200 can determine a label for a significant location based on the heading of the computing device 200. For example, the computing device 200 can determine based on GNSS data that the computing device 200 is at a location in which multiple POIs are aggregated. To differentiate between the POIs, the context analyzer 212 can obtain the heading of the computing device 200 (e.g., the direction in which the computing device 200 is facing). If the heading of the computing device 200 favors a particular POI, the context analyzer 212 can assign the label of that POI to the significant location. For instance, the computing device 200 can be located next to two POIs, each having an equal or nearly equal likelihood of being a significant location. If the computing device 200 is facing a particular POI (e.g., a center of the POI), the context analyzer 212 can assign that label of POI to the significant location.

In some cases, the heading of the computing device 200 can be determined using compass data obtained by the computing device 200. For example, the computing device 200 can include a compass that outputs the orientation of the computing device 200 with respect to the magnetic field of the Earth. In some cases, the heading of the computing device 200 can be determined based on a movement trajectory of the computing device 200. For example, the computing device 200 can determine its location multiple times over the course of time (e.g., continuously, periodically, or intermittently over a particular time period). Based on this information, the computing device 200 can determine its movement trajectory for that time period (e.g., by linking each of the locations in an ordered sequence, in order of their timestamps). If the movement trajectory of the computing device favors a particular POI, the context analyzer 212 can assign the label of that POI to the significant location. For instance, the computing device 200 can be located next to two POIs, each having an equal or nearly equal likelihood of being a significant location. If the movement trajectory of the computing device 200 points towards a particular POI, the context analyzer 212 can assign that label of POI to the significant location.

Identifying a Label Based on Attributes of POIs

In some implementations, computing device 200 can determine a label for a significant location based the attributes of nearby POIs. For instance, the contextual data sources 214 can include POI data 316 that describes one or more attributes, characteristics, or properties of one or more POIs. For example, the POI data 316 can include, for one or more POIs, hours of operation and/or days of operation of each POI, a textual description of each POI, a favorability of each POI, a popularity of each POI, a category of each POI, and so forth.

As an example, the computing device 200 can determine based on GNSS data that the computing device 200 is at a location in which multiple POIs are aggregated. To differentiate between the POIs, the context analyzer 212 can obtain POI data 316 for each of the POIs. Based on the POI data 316, the context analyzer 212 can determine whether each of the POIs are open or closed for business, and favor POIs that are open for business. For instance, the computing device 200 can be located next to two POIs, each having an equal or nearly equal likelihood of being a significant location. If one of the POIs is closed for business while the other is open for business, the context analyzer 212 can assign the label of the open POI to the significant location.

As another example, to differentiate between multiple POIs, the context analyzer 212 can determine a popularity of each of the POIs. In some cases, the popularity of a POI can correlate to or reflect a number of times that the POI was visited by the user of the computing device 200 and/or by other users in the past. In some cases, the popularity of a POI can correlate to or reflect a number of times that the POI was the subject of a search request (e.g., a search query input into a search engine). This information can be stored as POI data 316. Based on the POI data 316, the context analyzer 212 can favor POIs that are more popular than others. For instance, the computing device 200 can be located next to two POIs, each having an equal or nearly equal likelihood of being a significant location. If one of the POIs is more popular than the other, the context analyzer 212 can assign the label of the more popular POI to the significant location.

As another example, to differentiate between multiple POIs, the context analyzer 212 can determine a favorability of each of the POIs. In some cases, the favorability of a POI can be determined based on user rankings, reviews, or opinions. For example, one or more users can submit reviews, rankings, or opinions describing their experience with one or more POIs. This can include, for instance, submitting numerical scores (e.g., points, "thumbs ups," or "stars") with respect to one or more POIs. This information can be stored as POI data 316. Based on the POI data 316, the context analyzer 212 can favor POIs that are more favorable among users than others. For instance, the computing device 200 can be located next to two POIs, each having an equal or nearly equal likelihood of being a significant location. If one of the POIs is more favorable among users than the other, the context analyzer 212 can assign the label of the more favorable POI to the significant location.

As another example, to differentiate between multiple POIs, the context analyzer 212 can determine a category of each of the POIs. For instance, a POI can be categorized based on the type of business associated with the POI or a classification of the POI. As example, categories can include "restaurant," "store," "theater," "park," "office," "residence," "hotel," "grocery," among others. This information can be stored as POI data 316. If a user is more likely to be at a particular category of POI than others, the context analyzer 212 can favor POIs of that category over others.

In some cases, the likelihood that a user is at a particular category of POIs can depend on the time of day and/or a day of the week. For example, at 8 PM on a Saturday, the computing device 200 can be located next to two POIs, each having an equal or nearly equal likelihood of being a significant location. A first POI is categorized as a "school," while a second POI is categorized as a "restaurant." The context analyzer 212 can determine that given the time of day and/or the day of the week, that a user is more likely to be at a restaurant than a school. Thus, the context analyzer 212 can assign the label of the "restaurant" POI to the significant location.

In some cases, the likelihood that a user is at a particular category of POIs can depend on the preferences to a user. For instance, the context analyzer 212 can determine, based on a user's historical behavior, that the user favors certain types of categories of POIs over others. Thus, the context analyzer 212 can favor selecting POIs of those categories over others. For example, the computing device 200 can be located next to two POIs, each having an equal or nearly equal likelihood of being a significant location. A first POI is categorized as an "art gallery," while a second POI is categorized as a "bar." The context analyzer 212 can determine, based on the user's historical behavior, that the user tends to go to art galleries more than bars. Thus, the context analyzer 212 can assign the label of the "art gallery" POI to the significant location.

The user's behavior with respect to certain times of the day, days of the week, and/or dates in the year also can be considered in determining a user's preferences. For example, the context analyzer 212 can determine whether a user prefers a particular category over others during certain times of the day, certain days of the week, and/or certain dates in the year.

Other Examples

In some implementations, computing device 200 can determine a label for a significant location based on other data 314. The contextual data sources 214 can include other data 314 storing labels assigned to significant locations using techniques other than those described here. For example, in some cases, each context data source can assign a label to a significant location after multiple visits by the user to the same significant location.

Each of the context data sources described above can provide contextual data points for identifying a label to be associated with a significant location. The context analyzer 212 can identify multiple potential significant locations based on the contextual data points. The context analyzer 212 can disambiguate and resolve the multiple contextual data points to identify one of the multiple potential significant locations as having the highest likelihood of being the significant location at which the computing device 200 is located. For example, the context analyzer 212 can resolve the multiple potential significant locations to one significant location if more than half of the contextual data points identify the same POI as being that significant location. In another example, the context analyzer 212 can assign a respective weight to each potential significant location. The weights can be the same or different. For example, a contextual data point received from a maps application can be given more weight than a contextual data point received from a text messaging application. To resolve the multiple potential significant locations to one significant location, the context analyzer 212 can execute a weighted algorithm that considers the respective weight given to each contextual data point.

In some implementations, a search engine history, favorites list, reading list or bookmarks may contain contextual data that can be used to label a significant location. If multiple POIs are near a significant location, then the user's search history, favorites list, reading list or bookmarks can be used to filter the POIs. For example, referring again to the example of FIG. 1, a significant location may be near MOVIE THEATER and BURGER PLACE. Each of these POIs could be the actual significant location. However, the user bookmarked BURGER PLACE and/or has a search history that includes multiple searches on BURGER PLACE. In this case, BURGER PLACE could be selected over MOVIE THEATER as being the significant location.

In an embodiment, voice commands can be parsed to extract words or phrases that could provide "hints" about which of multiple POIs near a significant location is the significant location. For example, an intelligent personal assistant or knowledge navigator could receive a voice command "navigate to Burger Place" or a voice command "call Burger Place". These voice commands can be contextual data that can be used to filter POIs.

Figure 3B:
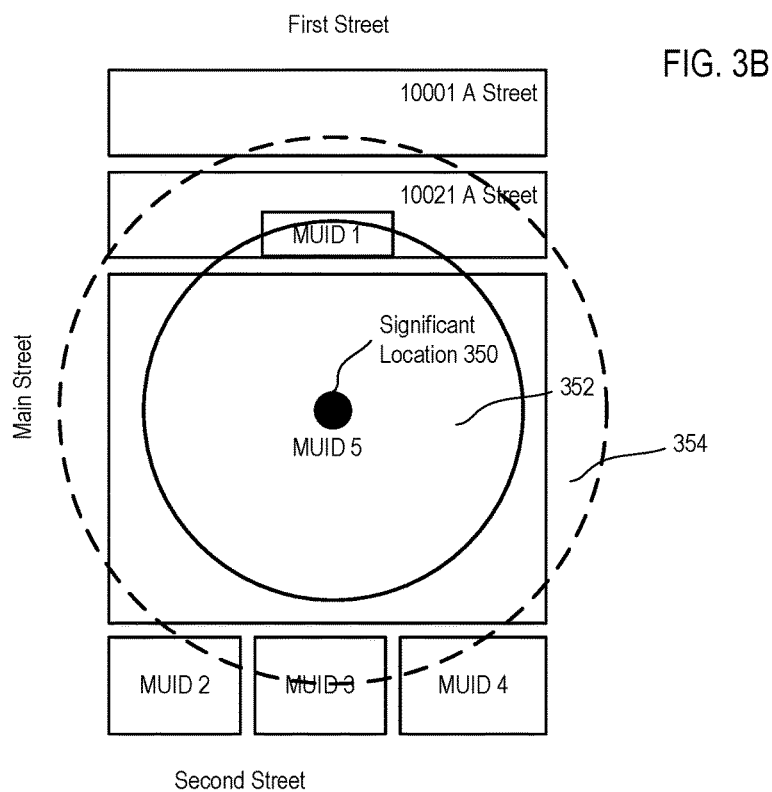
FIG. 3B is a schematic diagram illustrating two geographic areas associated with a significant location encompassing POIs.

FIG. 3B is a schematic diagram illustrating an extension of a geographic area of uncertainty encompassing a significant location. In the examples described above, data stored in each context data source was described as identifying a label for one significant location. In the example shown, an estimated significant location 350 is surrounded by a geographic area of uncertainty 352. The geographic area of uncertainty 352 represents an uncertainty associated with the estimated significant location 350. That is, the actual significant location of the computing device 200 can be located anywhere within the geographic area of uncertainty 352 represented by the uncertainty. To label the significant location, the computing device 200 can consider all the POIs that reside (either completely or partially) within the geographic area of uncertainty 352. In some implementations, to label the significant location, the computing device 200 can consider all the POIs that reside (either completely or partially) within a second geographic area of uncertainty 354 that is larger than (for example, by a factor greater than one such as two) the geographic area of uncertainty 352.

Figure 4:
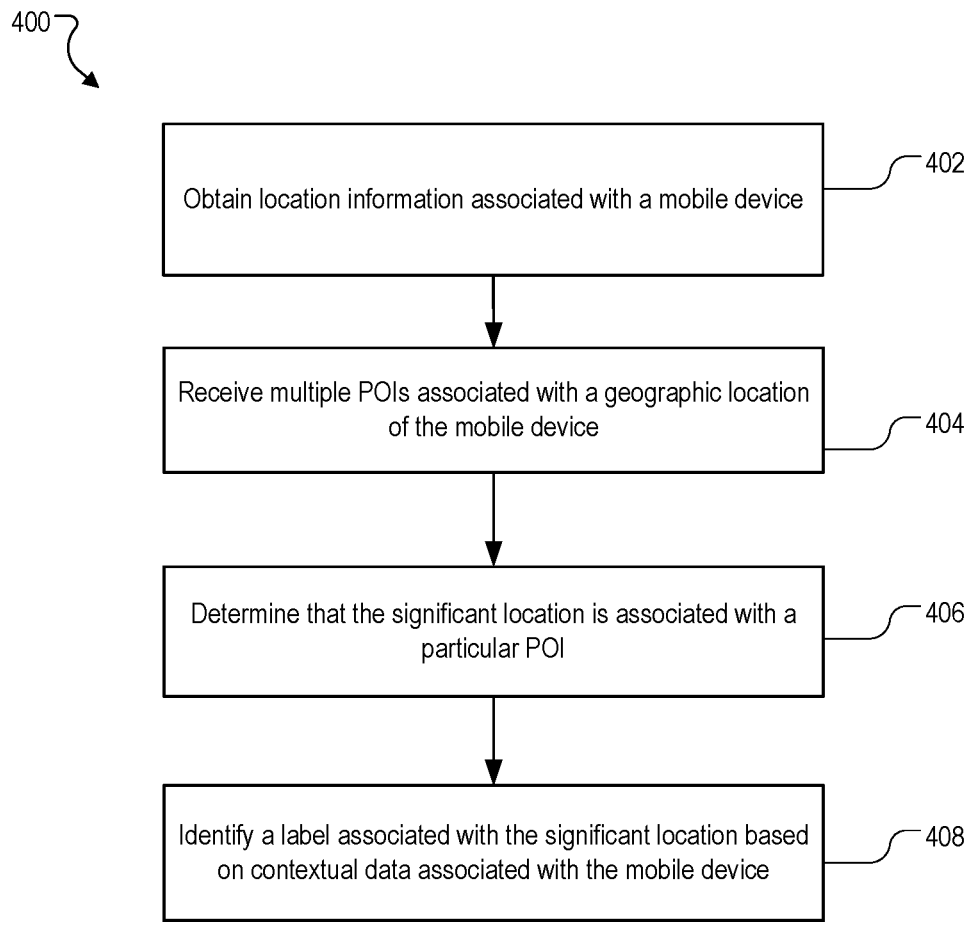
FIG. 4 is a flowchart of an example process for identifying labels for significant locations.

FIG. 4 is a flowchart of an example of a process 400 for identifying labels for significant locations. The process 400 can be implemented as computer instructions stored on a computer-readable storage medium and executed by one or more processors. For example, the process 400 can be implemented by the device architecture 500 described in reference to FIG. 5. In general, process 400 determines a significant location of the computing device. For example, at 402, process 400 obtains one or more significant locations. For example, a significant location estimator can provide a list of significant locations. At 404, for each significant location, process 400 identifies one or more POIs near the significant location. Each POI represents an entity, such as a business, public landmark, school, hospital, etc. Process 400 determines a label for the determined significant location based on contextual data associated with the significant location. At 406, process 400 determines that a POI is the significant location based on contextual data. Examples of contextual data include but are not limited to: transaction data, calendar data, map data, communication data, voice commands, and any other data that can provide information that can be used to identify a POI as a significant location. At 408, a label associated with the determined POI is used to label the significant location.

Exemplary Determination of Significant Locations

Some examples of techniques to determine significant locations are described in this and the following paragraphs. Details about determining significant locations are described in U.S. patent application Ser. No. 14/502,677 entitled "Location-Based Services For Calendar Events", filed on Sep. 30, 2014 and the entire contents of which are incorporated by reference herein in its entirety. Computing device 200 can use machine learning and data mining techniques to learn the past movement of computing device 200. The past movement can be recorded as significant locations visited by computing device 200 and movement of computing device 200 between the significant locations. Computing device 200 can determine that a place or region is a significant location upon determining that, with sufficient certainty, computing device 200 has stayed at the place or region for a sufficient amount of time. The amount of time can be sufficient if it satisfies various criteria, for example, when the amount of time satisfies a time length threshold (for example, X hours) or a frequency threshold (for example, X minutes per day, Y number of days per week). Records of movement of computing device 200 can include a measured or calculated time of entry into each significant location and a measured or calculated time of exit from each significant location. A significant location can be associated with multiple entries and exits.

In addition to significant locations, the records of movement can include transitions between the significant locations. Each transition from a first significant location to a second significant location can be associated with a transition begin timestamp indicating a time computing device 200 leaves the first significant location and a transition end timestamp indicating a time computing device 200 enters the second significant location.

Computing device 200 can represent the records of movement as a state model. State model can include states, each representing a significant location, and transitions, each representing a movement of computing device 200 between significant locations. Additional details of determining the state model are described below.

Based on the state model, computing device 200 can determine (1) a transition probability density that, at a given time, computing device 200 moves from a given significant location to each other significant location, or (2) an entry probability density that computing device 200 enters a significant location from a previously unknown or unrepresented location. A pattern analyzer of computing device 200 can determine a daily, weekly, monthly, or annual movement pattern of computing device 200 using the state model. A predictive engine of computing device 200 can use transition probability density (or entry probability density) and the movement pattern to forecast a significant location that computing device 200 will enter (or stay) at a future time. Computing device 200 can then use the forecast to provide predictive user assistance, for example, to assist the user to plan for a future event.

Exemplary Techniques of Constructing a State Model

The computing device 200 can use the learning techniques to determine the state model. Computing device 200 can sequentially trace location data through time (T). Sequentially tracing location data can be performed by piggybacking on another application to avoid or reduce cost of location data collection. For example, computing device 200 can collect the location data when another service requests location from a location determination subsystem of computing device 200. Accordingly, collecting the location data can be "free" without having to activate the location determination subsystem solely for determining a movement pattern of computing device 200.

Computing device 200 can collect multiple locations over time T. Collecting new locations can be ongoing operations. Locations can be purged based on a variety of policies, including age, user preference or privacy. The multiple locations can each include latitude, longitude, and altitude coordinates, with a degree of uncertainty in each of these, and be associated with a timestamp indicating a time the corresponding location is collected.

Computing device 200 can determine that some of locations belong to location clusters that may indicate a significant location. Computing device 200 can determine that a location cluster is formed upon determining that (1) at least a pre-specified threshold number (for example, two) of consecutive locations are collected; (2) a time span of the consecutive locations satisfies a pre-specified threshold time window; and (3) these locations are identical, indicating that computing device 200 is stationary, or sufficiently close to one another, indicating that computing device 200 is located in a sufficiently small and defined area during the time the locations are collected.

For example, computing device 200 can determine two location clusters over time T. A first location cluster can include a first subset of locations collected over a time period [T1, T2] that is longer than a threshold time window (for example, a time window of 45 minutes). Computing device 200 can determine that the first location cluster includes the locations in the subset upon determining that a variance of the locations is low enough to satisfy a variance threshold. Likewise, a second location cluster can include a second subset of locations, which are collected within time period [T3, T4]. Computing device 200 can determine that the second location cluster includes the locations in the second subset upon determining that a variance of the locations satisfies the variance threshold.

An outlier detection mechanism can filter out locations that do not belong to clusters. For example, computing device 200 can determine that a location is different from locations in the two subsets (for example, based on a distance threshold being exceeded). In addition, computing device 200 can determine that no other locations are (1) collected within the threshold time window before or after the location and (2) geographically close to that location. In response, computing device 200 can determine that the location is an outlier and discard the location. In addition, if a location in a time period is significantly different from many other locations in the time period, computing device 200 can discard the different location as an outlier and determine the location cluster using other locations in the time window. Computing device 200 can use the first and second location clusters to determine significant locations and states of the state model.

In some implementations, one of the conditions for determining a location cluster is that a time span of the consecutive locations satisfies a variable threshold time window. The threshold can vary based on whether computing device 200 has a hint of significance of a location.

At various times, computing device 200 can be located at different locations. The different locations can be far apart from one another, indicating that computing device 200 is moving. Computing device 200 can be located at the different locations during a continuous period of time. The different locations can be identical or sufficiently close to one another. Computing device 200 can determine whether the period of time is sufficiently long such that the different locations form a location cluster that indicates a significant location, based on whether the period of time satisfies a variable threshold. Computing device 200 can use various hints to determine the variable threshold.

For example, computing device 200 can search locations where computing device 200 visited previously. Computing device 200 can designate as a first hint a record indicating that computing device 200 previously visited the location at or near the different locations as a first hint. Computing device 200 can examine a user search history performed on or through computing device 200. If the user searched for the location before, computing device 200 can designate a search query including an address at or near the different locations, or a business located at or near the different locations, as a second hint. Computing device 200 can designate a calendar item in a user calendar (for example, an appointment or a meeting) located at or near the different locations as a third hint.

Upon detecting one or more hints, computing device 200 can use a shorter time period, for example, five minutes, as a threshold for determining a location cluster or significant location. More hints can correspond to shorter threshold. Accordingly, computing device 200 can determine a significant location upon detecting a location of the computing device, when the short time threshold is satisfied.

If no hint is found, computing device 200 can use a longer time period, for example, 20 minutes, as a threshold for determining a location cluster or significant location. Accordingly, when no hint is found, computing device 200 can determine a location cluster or significant location upon detecting a location of computing device 200, when the long time threshold is satisfied. In either case, with or without a hint, computing device 200 can determine a significant location in real time, for example, 5 minutes or 20 minutes after locations converge into a cluster.

Using the techniques described above, computing device 200 can identify location clusters. Computing device 200 can determine significant locations based on the location clusters.

Computing device 200 can determine each of the significant locations based on the location clusters using the locations in each of the location clusters. Determining the significant locations can be based on recursive filter with a constant gain. Details of determining the significant locations are provided below. Each of the significant locations can include latitude, longitude, and optionally, altitude coordinates. Each of the significant locations can be associated with one or more location clusters. For example, a first significant location can correspond to a first location cluster in time period [T1, T2] and a third location cluster during time period [T7, T8]. The location in the first location cluster and the third location cluster can be identical. The length of time period [T1, T2] and time window [T7, T8] can be the same or different.

Computing device 200 can have an initial state model at time T2. At time T2+k, computing device 200 can receive incremental location data, where k is a difference between time T2 and the time the additional location data are received (in this example, k=T7−T2). Computing device 200 can use the incremental location data to determine the significant location for use in the state model. Computing device 200 can determine that the first location cluster corresponds to latitude and longitude coordinates X1. Computing device 200 can determine that the third location cluster corresponds to latitude and longitude coordinates X2. Computing device 200 can determine that a distance between X1 and X2 satisfies a threshold. In response, computing device 200 can determine that the first location cluster and the third location cluster belong to a same location (e.g., the same significant location). Computing device 200 can then add the third location cluster to the significant location using constant gain filter as shown below in Equation (1).

$$\frac{X2 + \alpha X1}{1 + \alpha}, \text{ where } \alpha \geq 1 \qquad (1)$$

Each of the significant locations can be associated with one or more entry timestamps and one or more exit timestamps. Each entry timestamp can correspond to a time associated with a first location in a location cluster. For example, a first entry timestamp associated with the significant location can be a timestamp associated with a location, which is the first location of the first location cluster. A second entry timestamp associated with a significant location can be a timestamp associated with a first location in the third location cluster. Likewise, each exit timestamp can correspond to a time associated with a last location in a location cluster. For example, a first exit timestamp associated with the first significant location can be a timestamp associated with the location, which is the last location of the first location cluster. A second entry timestamp associated with the significant location can be a timestamp associated with a last location in the third location cluster.

Example Location Label Harvesting System

As previously described, computing device 200 is capable of labeling locations including locations that are significant to a user of computing device 200. Once computing device 200 obtains a label for a location, the location label and a wireless access point data is harvested or "crowdsourced" by one or more server computers and used to update a database (or other data structure) coupled to the server computers. In an embodiment, multiple computing devices 200 monitor their respective significant locations and observe wireless signals transmitted from wireless access points (e.g., Wi-Fi access points) at the respective significant locations. The monitoring can be a background process that is transparent to the user. In some embodiments, the monitoring can be performed by a low-power wireless baseband processor of the computing device rather than a central processing unit of the computing device that consumes more power than the baseband processor. The location label and wireless access point data are cached locally on the computing device 200, as described in reference to FIG. 5. In an embodiment, the cached data is persisted on the computing device 200 until a time when the cached data can be uploaded to the one or more server computers (an "upload opportunity"). An example upload opportunity is when the computing device is online or in communication with a network server computer and the network has sufficient bandwidth to handle the upload and the computing device has sufficient power to perform the upload. For example, sufficient bandwidth and power means computing device 200 has enough processing cycles and power (e.g., battery power) to establish and maintain a communication session with the one or more server computers through a wired or wireless communication network.

A requesting computing device operating at a significant location can use wireless access point data (e.g., Wi-Fi scan data) to obtain a location label from the service to be used by, for example, a mapping or navigation application running on the requesting device. For example, if a harvested computing device learns a discrete significant location and is able to label the significant location as "Big Al's Pizza," then the requesting device can benefit from the location label that was provided by the harvested computing device.

Figure 5:
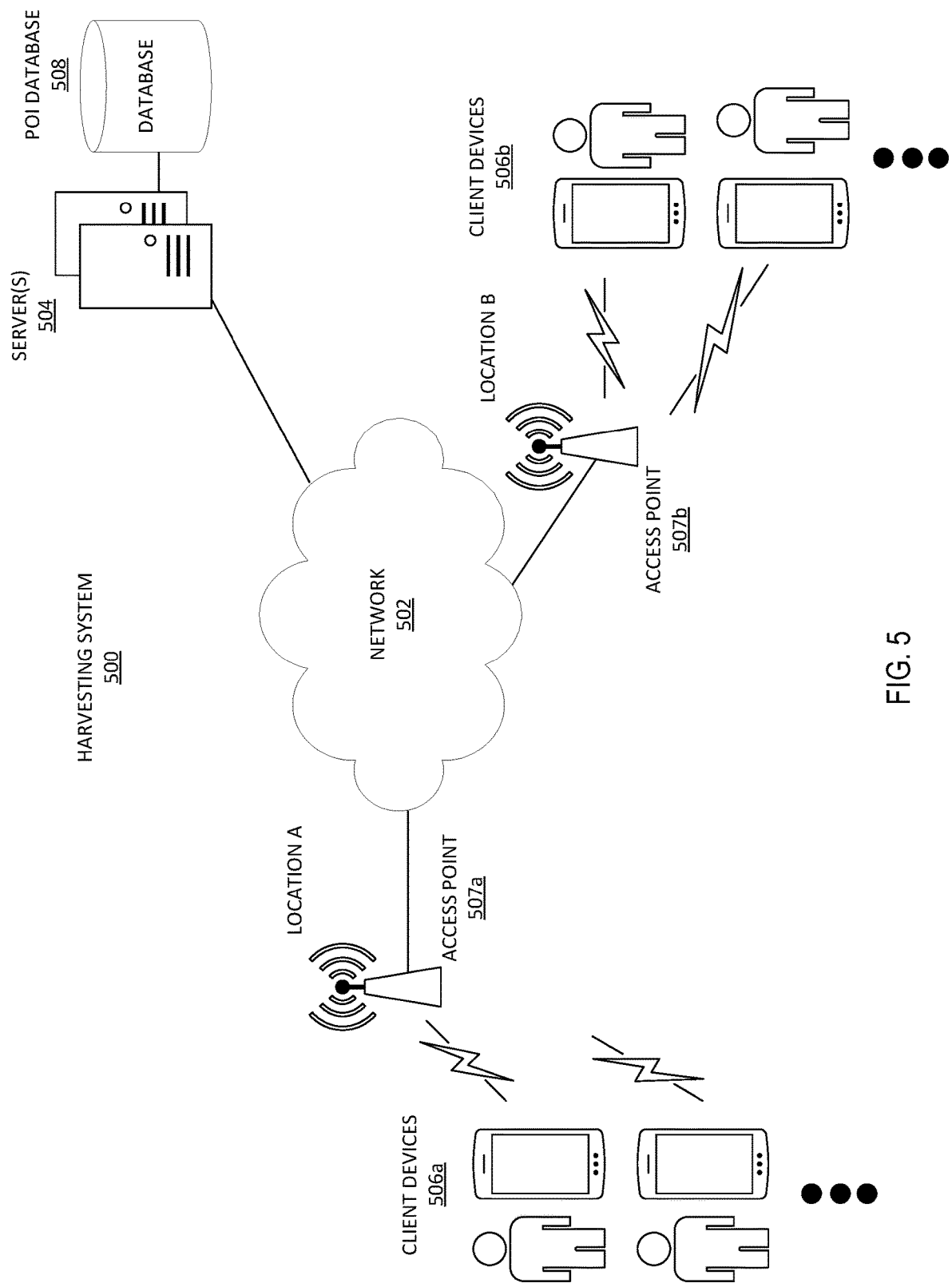
FIG. 5 is a conceptual diagram of an example system for harvesting labels for locations.

FIG. 5 is a conceptual diagram of an example harvesting system 500 for harvesting location labels. System 500 can include network 502, one or more server computers 504, and client devices 506a,506b. Client devices 506a, 506b are computing devices from which location data is harvested as previously described in reference to FIGS. 1-4 (hereafter also referred to as "harvested devices"). Client devices 506a, 506b can couple to network 502 through a variety of wireless and wired access points 507a, 507b including but not limited to wireless access points (e.g., Wi-Fi access points), cell towers, and wired network connections (e.g., Ethernet). Network 502 can include one or more networks including, for example, the Internet. Client devices 506a, 506b can operate at different geographic locations throughout the world. One or more databases 508 can be coupled to the one or more server computers 504 for storing location labels and other location data.

An example of location label harvesting will now be described in reference to FIG. 5. Client devices 506a are operating at location A and client devices 506b are operating at location B. For each of client devices 506a, location A is a learned significant location. Client devices 506a can communicate with server computer(s) 504 through access point 507a and network 502. Similarly, for each of client devices 506b, location B is a learned significant location. Client devices 506b can communicate with server computer(s) 504 through access point 507b and network 502. The significant location can be learned and labeled using the methods described in reference to FIGS. 1-4. Although two locations and four client devices are described, in practice any number of locations and client devices can be used.

In an embodiment, the harvesting can be triggered by a transaction event, where client devices 506a, 506b are used to pay for a product or service at a point of sale. Transaction event data (e.g., a timestamp, description, geographic location of the point of sale) is stored on client devices 506a, 506b. Wireless access point data (e.g., a Wi-Fi scan data) and motion classification data are also obtained and stored on client devices 506a, 506b. Motion classification data can include information describing the motion of the client device based on sensor data provided by one or more sensors (e.g., accelerometer, gyro, magnetometer) onboard or coupled to the client device. Some examples of motion classification data can include but are not limited to: walking, running, driving and biking. In an embodiment, raw sensor data can be stored in addition to, or in lieu of, the motion classification data. Motion classification data can be useful for determining whether a user is walking into a significant location (e.g., a retail store) rather than driving by a significant location in a car.

In an embodiment, the wireless access point data can include received signal strength indicator (RSSI) values (or some other signal strength metrics) for RF signals received from the wireless access points at the location. In an embodiment, the RF signals can be Wi-Fi signals and client devices 506a, 506b can generate RSSI values from results of Wi-Fi scans. The RSSI values can be associated with timestamps and hardware identifiers for the Wi-Fi access points such as media access control (MAC) addresses. Hereafter, the collection of RSSI values observed by a client device at a particular location are also referred to as a "fingerprint" or "location fingerprint" of that location.

In an embodiment, the transaction event data, wireless access point data and motion classification data (and/or raw sensor data) are stored continuously in one or more ring buffers (collectively referred to as "location data"). In an embodiment, when a transaction event occurs, the location data is collected from the ring buffer(s) for a time period before, during and after the transaction event timestamp. For example, location data can be collected from the ring buffer(s) 30 seconds before the transaction event begins and 30 seconds after the transaction event ends based on, for example, a timestamp of the transaction event.

In this harvesting example, each of client devices 506a, 506b has previously obtained a location label using contextual data, as described in reference to FIGS. 1-4 and the label is stored as part of the location data by each client device 506a, 506b. Client devices 506a, 506b upload the location data to server computer(s) 504 through access points 507a, 507b and network 502, where the location data is stored by server computer(s) 504 in database 508. In an embodiment, client devices 506a, 506b look for an upload opportunity (e.g., connection to server computer(s) 504) and perform the upload using a background process transparent to the user of the client device. In an embodiment, the upload is incremental to conserve power on the client device.

At the server computer(s) 504, the RSSI values included in the location data are used to update a probability distribution of RSSI values for the given location. In an embodiment, the location can be a cell in a virtual grid overlying a geographic space (also referred to as a radio map) and the probability distribution of RSSI values can be associated with the cell. When the probability distribution for the cell is updated with the RSSI values, the location label that was included in the location data is associated with the cell in database 508.

When a requesting device is operating at location A or location B, a request or query is sent to server computer(s) 504 that includes wireless access point data. The wireless access point data (e.g., RSSI values) are compared to fingerprints stored in database 508. Each fingerprint can be associated with geographic coordinates (e.g., latitude, longitude, altitude) in a deterministic or statistical manner, as described in further detail in reference to FIG. 9. When a match with a fingerprint is determined, server computer(s) 504 respond to the request/query with the location label associated with the matched fingerprint. The request/query can be made by, for example, an application running on the requesting device such as a mapping or navigation application. The location label can then be used to label location A or location B on a map provided by the mapping application or a navigation application.

By harvesting labels for locations with fingerprints, discrete indoor significant locations can be identified with labels meaningful to the user. For example, "Big Al's Pizza" (an indoor discrete location) could be a restaurant located within "ACME Shopping Mall." By associating labels with fingerprints stored in the one or more databases 508, the discrete location label "Big Al's Pizza" can be shown on a map rather than the non-discrete location label "ACME Shopping Mall." Therefore, the user's location is represented by a marker on the map with a label that is more precise and therefore more informative to the user.

In some embodiments, in addition to wireless access point data other environment data can be sent to server computer(s) 504 to assist in identifying a label for a location. Such environment data can include but is not limited to: data representing ambient light or ambient noise, client device sensor data (e.g., accelerometer data, gyro data, magnetometer data), network identifiers, temperature, barometric pressure, and any other data that can be used to associate a location label with a fingerprint.

Example Label Harvesting Processes

Figure 6:
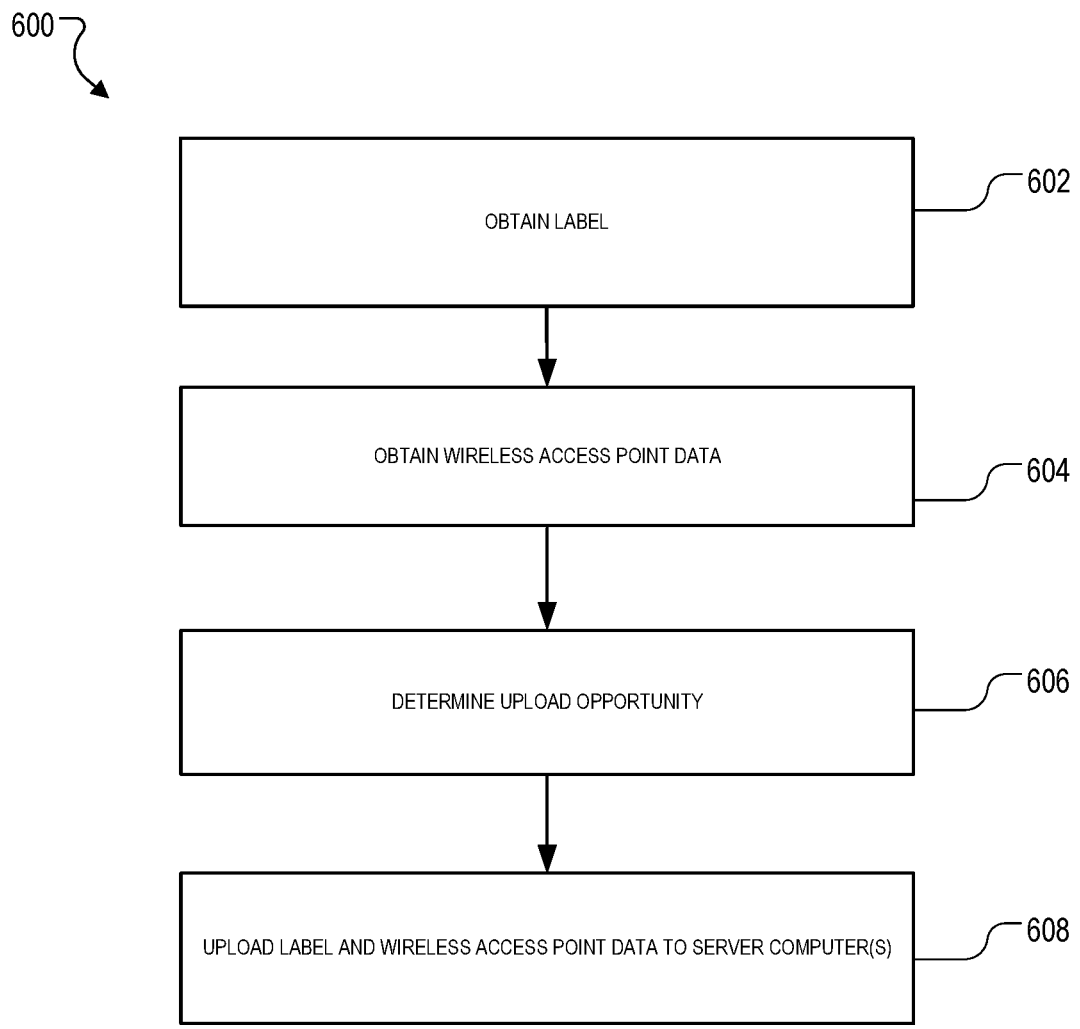
FIG. 6 is a flowchart of an example process for harvesting labels for locations performed by a computing device.

FIG. 6 is a flowchart of an example process 600 for harvesting labels for locations performed by a client device. Process 600 can be performed using device architecture 1000, as described in reference to FIG. 10.

Process 600 can begin by obtaining, by a client device, a label for a location of the client device (602). For example, contextual data can be used to determine a meaningful label of a signification location, as described in reference to FIGS. 1-4.

Process 600 can continue by obtaining, by the client device, wireless access point data (604). For example, before, during and after a transaction event, a wireless transceiver operating on the client device can calculate RSSI values for radio frequency signals transmitted by a plurality of wireless access points at the location (e.g., location A or B). The RSSI values and other wireless access point data (timestamp, MAC addresses) are stored on the client device in, for example, one or more ring buffers. Also, transaction data can also be stored on the client device. The transaction data can include data associated with the location A or B (a point of sale of a good or service) and include a timestamp, description (e.g., store description or label) and possibly a geographic location or a "hint" of a geographic location. For example, a "hint" can include the name of a city, street or neighborhood in the name of the product or service provider, such as "North Beach Pizza," which may be found in transaction event data, such as an electronic receipt.

Process 600 can continue by determining an upload opportunity (606) for the cached location data. For example, the client device can determine that a connection has been established with server computer(s) 504 and that there is sufficient network bandwidth and client device processing power to perform an upload. The upload can be incremental in that only data that has changed since a last upload is updated.

Process 600 can continue by uploading (608) the harvested location data to server computer(s) 504. For example, the location data can be sent in one or more packets to server computer(s) 504.

Figure 7:
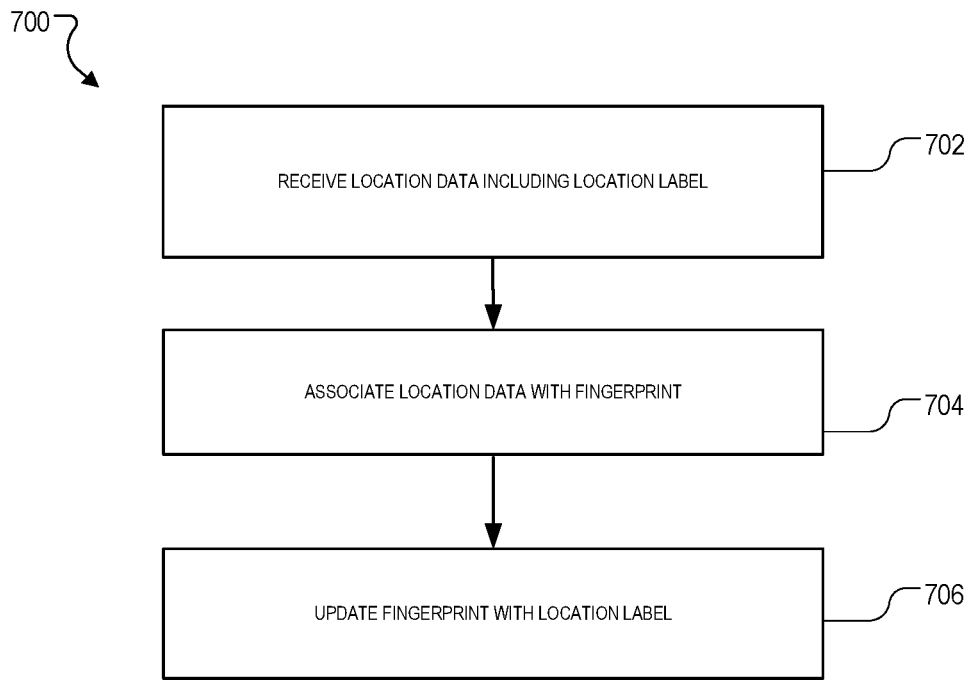
FIG. 7 is a flowchart of an example process for harvesting labels for locations performed by a server computer(s).

FIG. 7 is a flowchart of an example process 700 for harvesting labels for locations performed by one or more server computers. Process 700 can begin by receiving, by server computer(s), harvested location data including wireless access point data and a location label from a plurality of client devices (702). In an embodiment, the wireless access point data can include but is not limited to: estimated device location, RSSI values observed, MAC addresses, timestamps and motion data (e.g., acceleration data, compass data). The estimated device location can be determined by the client device using GNSS data (if outdoors and available) or it can be provided by a user using a surveying device based on a floorplan or other survey data.

Process 700 continues by associating the harvested location data with a fingerprint (704) and updating the fingerprint with the harvested location data in a database or other data structure (706). For example, a probability distribution of RSSI values associated with the location can be updated by the harvested RSSI values. Additionally, if no label is associated with the Wi-Fi fingerprint, then the Wi-Fi fingerprint can be associated with the harvested location label in the database or other data structure. In an embodiment, if a conflict of location labels is observed (e.g., different label descriptions) over multiple updates, server computer(s) 504 can create a histogram or other statistical construct of received location labels from client devices and select the location label with the highest frequency or count as the best location label.

In an embodiment, other environment fingerprints can be updated or associated with the location. For example, "Big Al's Pizza" could be located on a first floor of the mall and the user is located at a store on a second floor of the mall above Big Al's Pizza. The wireless access point data may not be discrete enough to determine the store at which the user is located. In such a scenario, barometric pressure data or altitude data could be used to determine the correct discrete location of the user. Such information can be combined with Wi-Fi scan data to create an environment fingerprint.

Figure 8:
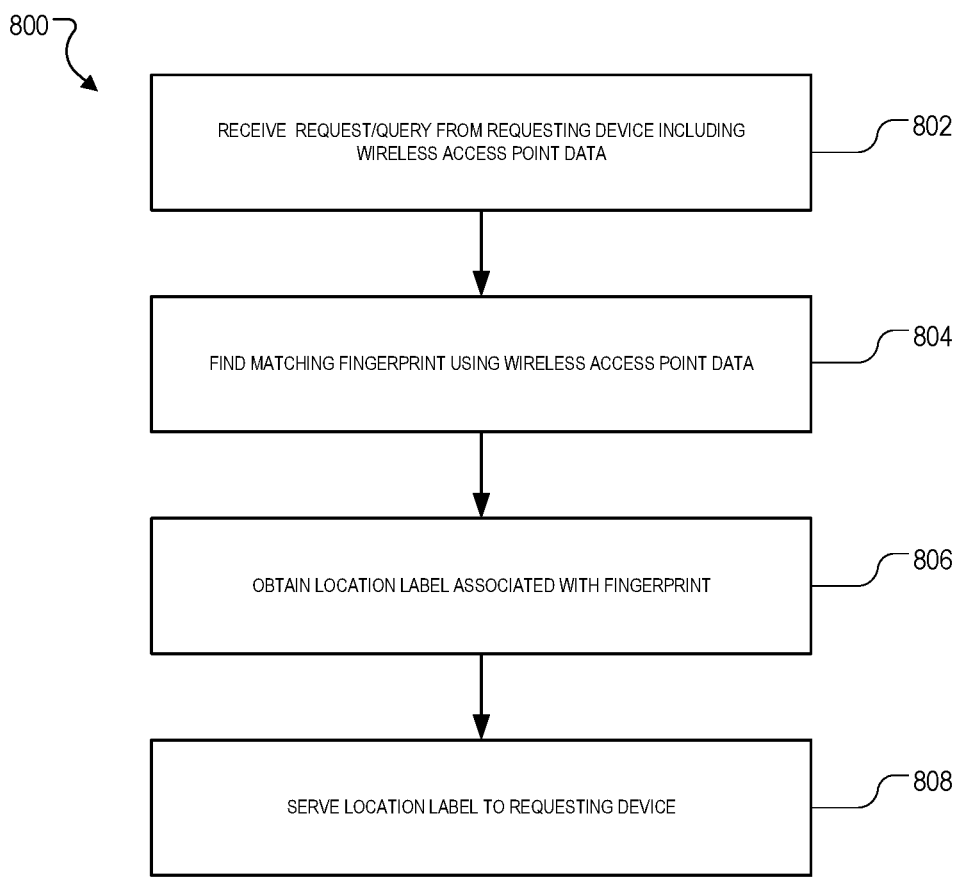
FIG. 8 is a flowchart of an example process for serving labels for locations performed by a server computer(s).

FIG. 8 is a flowchart of an example process 800 for serving labels for locations performed by one or more server computers. Process 800 can begin by receiving a request/query for location and/or POI data from a requesting device that includes wireless access point data (802). The request/query can be made by an operating system or application (e.g., a mapping application or search engine) running on the requesting device. The wireless access point data can include, for example, a fingerprint (e.g., RSSI values and MAC addresses) collected by a wireless scan at the location. The request/query can also include a location estimate calculated by the requesting device using, for example, the wireless access point data and a radio map provided by the one or more server computers. Process 800 then matches the fingerprint received with the request/query with a labeled fingerprint in a database coupled to the one or more servers (804), as described in reference to FIG. 9. Process 800 can continue by obtaining a location label associated with a fingerprint in the database (806) and then serving the obtained location label to the requesting device (808).

An example database is shown in Table I.

TABLE I

Example Wi-Fi Database with Location Labels

| RSSI Values | PDF Parameters | MAC addresses | Timestamps | Location Labels | Location |
|---|---|---|---|---|---|
| RSSI[0] | Mean, | MAC_addr[0] | Timestamp[0] | Label | Lat, Lon, Alt |
| RSSI[1] | Variance | MAC_addr[1] | Timestamp[0] | | |
| RSSI[2] | | MAC_addr[2] | Timestamp[0] | | |
| RSSI[0] | Mean, | MAC_addr[0] | Timestamp[0] | Label | Lat, Lon, Alt |
| RSSI[1] | Variance | MAC_addr[1] | Timestamp[1] | | |
| RSSI[2] | | MAC_addr[2] | Timestamp[2] | | |
| RSSI[3] | | MAC_addr[3] | Timestamp[3] | | |
| RSSI[0] | Mean, | MAC_addr[0] | Timestamp[0] | Label | Lat, Lon, Alt |
| RSSI[1] | Variance | MAC_addr[1] | Timestamp[1] | | |

The example Wi-Fi database shows 3 example records. Each record includes a fingerprint, which in this case includes RSSI values for observed access points, MAC addresses of the observed access points, timestamps of when the observations were made and a location label associated with the fingerprint. Note that for each example record there can be any number of access point observations depending on the number of access points at the location. In the example shown, the location labels are included with the location information but could also be in a separate database. The fingerprint matching can be either deterministic or probabilistic. For probabilistic fingerprint matching, statistics (e.g., mean, variance) can be included in the database for determining the probability density function of RSSI values at the location can be stored, as described in reference to FIG. 9.

Figure 9:
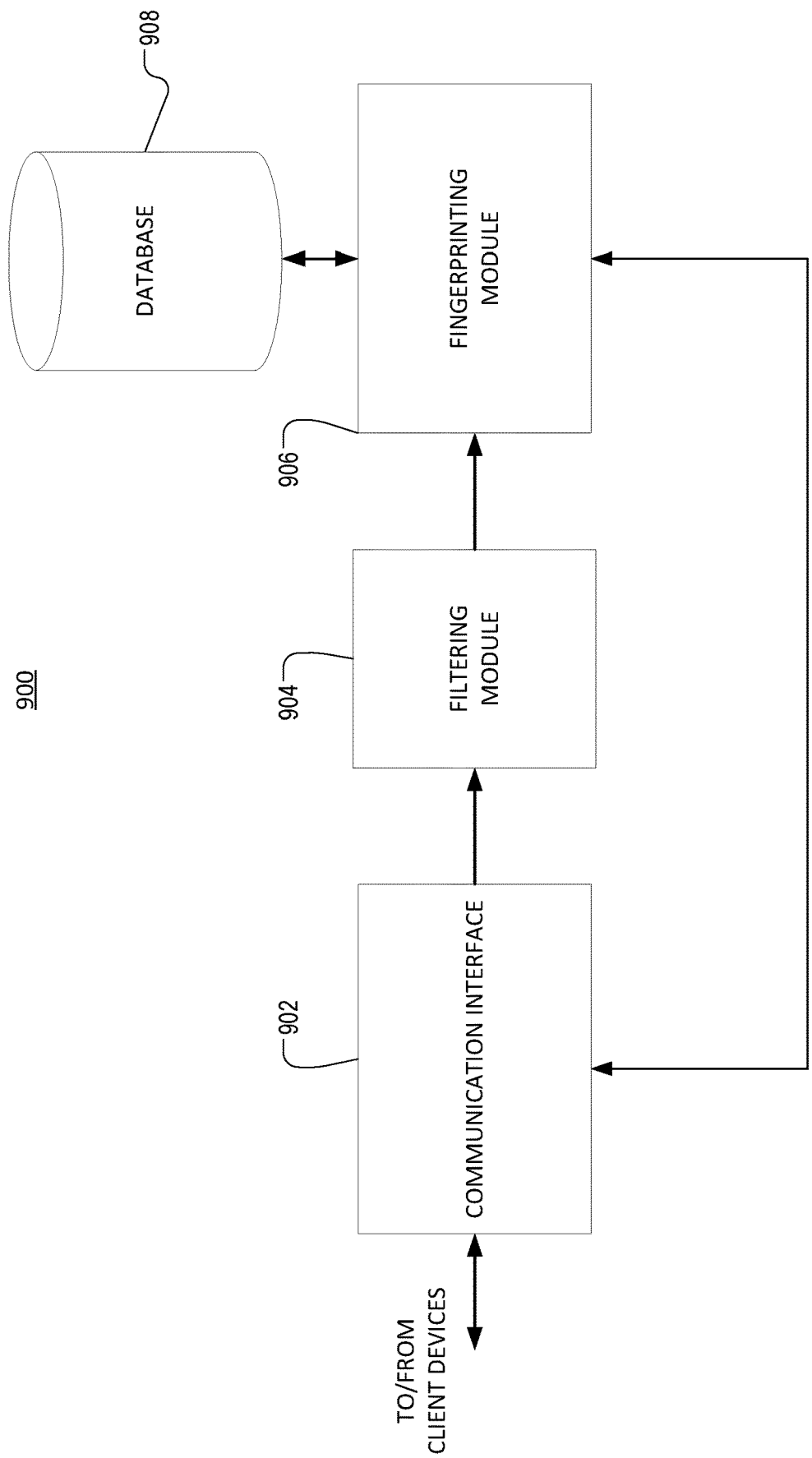
FIG. 9 is a conceptual block diagram of another example system for harvesting and serving labels for locations.

FIG. 9 is a conceptual block diagram of an example system 900 implemented by one or more server computers for harvesting and serving labels for locations. In the example embodiment shown, system 900 includes server 902, filtering module 904, fingerprinting module 906 and database 908.

Server 902 provides an interface to client devices and requesting devices. Server 909 is coupled to network 102 and transmits and receives packets to and from client devices and requesting devices. Filtering module 904 culls out bad location data that is determined to be outlier data so that the location data does not infect the fingerprints. For example, fingerprints associated with moving access points are identified and discarded based on, for example, motion classification data and/or raw sensor data. Also, outlier data that violates consistency checks is discarded. For example, due to severe multipath at some harvesting locations one or more RSSI values may be substantially different than other RSSI values possibly indicating that the RSSI value is corrupted.

In an embodiment, fingerprinting module 906 performs at least two functions. The first function is to use the harvested location data to update the fingerprint database 908 by, for example, updating fingerprints with location labels. The second function is to process requests/queries from requesting devices (e.g., from a mapping application or operating system service running on the requesting device) to obtain location labels for the locations and to respond to request/query with the estimated location and location label.

For the second function, database 908 includes radio maps of areas based on previously harvested wireless access point data, such as RSSI values data calculated from wireless access point transmissions observed at multiple reference locations in the areas and generates a probability distribution of RSSI values for each reference location. RSSI values obtained by a requesting device are then compared to the fingerprint to find the closest match and generate an estimated location of the requesting device. Fingerprinting module 906 takes the live RSSI values as input and generates data necessary to build or update the RSSI probability distribution for each reference location in the area. In an embodiment, the area can be conceptually divided into a grid of cells, where a probability distribution of RSSI values is generated for each cell in the grid.

In some embodiments, a Markov localization or Bayes' theorem can be used to estimate or predict the most likely location of the requesting device. Using Markov localization, a prediction step can be represented mathematically by Equation [1]:

$$p(L_t) = \Sigma_{L_{t-1}} p(L_t | L_{t-1}) p(L_{t-1}), \qquad [1]$$

where $p(L_t)$ is the probability of being at location L at time t and $p(L_t | L_{t-1})$ is the probability of being at location L at time t given the previous location L at time t−1. The prediction step is then followed by a correction step given by Equation [2]:

$$p(L_t | \vec{R}) = p(\vec{R} | L_t) p(L_t) * N, \qquad [2]$$

where $p(L_t | \vec{R})$ is the probability of being at location L at time t given the vector of RSSI values $\vec{R}$ received at time t, $p(\vec{R} | L_t) p(L_t)$ is the probability distribution generated from the harvested RSSI values, $p(L_t)$ is the probability of being at that location from Equation [1] and N is a normalization factor.

Equation [2] can be calculated for every fingerprint in the radio map for the area and the fingerprint that yields the maximum probability $p(L_t | \vec{R})$ is the matched fingerprint. The location label associated with the matched fingerprint in database 908 is downloaded to the requesting device from server computer(s) 504.

In another embodiment, the most probable location l given an observation vector of $\vec{s}$ of k RSSI values can be determined using Bayes' theorem as shown in Equation [3]:

$$\mathrm{argmax}_l [P(l | \vec{s})] = \mathrm{argmax}_l [\Pi_{i=1}^k P(s_i | l)], \qquad [3]$$

where $P(s_i | l)$ is the probability distribution of RSSI values for reference location t in the area. Equation [3] assumes that all reference locations l in the area are equally likely and the probability of observing $\vec{s}$ or $P(\vec{s})$ is constant for all reference locations l. The location label in database 908 associated with the most probable location l as determined by Equation [3] is downloaded to the requesting device from server computer(s) 504.

Additional Example Location Label Harvesting System

Figure 10:
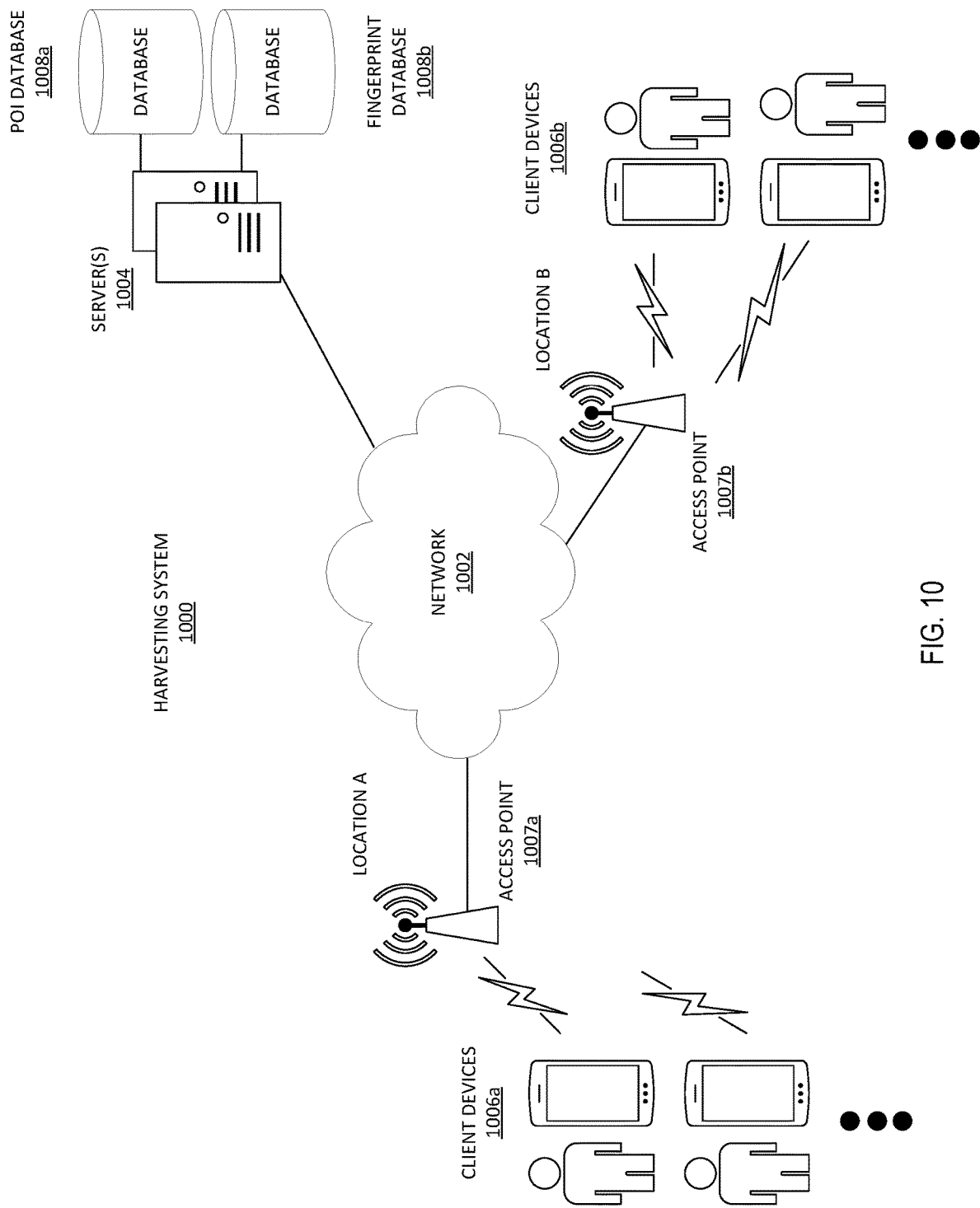
FIG. 10 is a conceptual block diagram of another example system for harvesting and serving labels for locations.

FIG. 10 is a conceptual diagram of another example harvesting system 1000 for harvesting location labels. System 1000 can include network 1002, one or more server computers 1004, and client devices 1006a, 1006b.

The client devices 1006a, 1006b can be similar to those described with respect to FIG. 5. For example, the client devices 1006a, 1006b can be computing devices from which location data is harvested (hereafter also referred to as "harvested devices"). In some cases, location data can be harvested according to the techniques described with respect to FIGS. 1-4. Client devices 1006a, 1006b can couple to network 1002 through a variety of wireless and wired access points 1007a, 1007b including but not limited to wireless access points (e.g., Wi-Fi access points), cell towers, and wired network connections (e.g., Ethernet). Network 1002 can include one or more networks including, for example, the Internet. Client devices 1006a, 1006b can operate at different geographic locations throughout the world.

Databases 1008a, 1008b are coupled to the one or more server computers 1004 for storing POI data, POI labels, fingerprint data, and other location data. Information stored in the databases 1008a, 1008b can be used to determine labels for one or more locations (e.g., significant locations and/or POIs).

The POI database 1008a stores information regarding one of more POIs. For example, for each POI, the POI database 1008a can store a geographical location of the POI and a label associated with the POI. In some cases, the POI database 1008a can store geographical coordinates of a POI (e.g., latitude and longitude). Further, the POI database 1008a can store one or more labels harvested from one or more of the client devices 1006a, 1006b.

The POI database 1008a can also include information regarding the attributes of each POI. As an example, for each POI, the POI database 1008a can store contact information regarding the POI, such as a phone number, fax number, e-mail address, or Internet address for a webpage associated with the POI. As another example, for each POI, the POI database 1008a can store an indication of the hours of operation and/or the days of operation of the POI. As another example, for each POI, the POI database 1008a can store one or more user reviews, rankings, or opinions regarding the POI. As another example, for each POI, the POI database 1008a can store a category or classification of the POI (e.g., restaurant, store, theater, park, office, residence, hotel, grocery, etc.). As another example, for each POI, the POI database 1008a can store text, videos, audio, images, and/or other information describing the POI.

The fingerprint database 1008b stores fingerprint data regarding one or more POIs. For example, for each POI, the fingerprint database 1008b can store environmental measurements obtained at or near the POI by one or more devices, such as RSSI values (or some other signal strength metrics) for RF signals received from wireless access points at the POI. In some cases, the RSSI values can be obtained based on wireless scans conducted by one or more of the client devices 1006a, 1006b while they were positioned at the POI.

As another example, for each POI, the fingerprint database 1008b can store transaction event information regarding one or more transactions conducted at the POI (e.g., a timestamp, description, geographic location of the point of sale). In some cases, the transaction event information can be obtained based on transactions conducted by one or more of the client devices 1006a, 1006b while they were positioned at the POI.

As another example, for each POI, the fingerprint database 1008b can store information regarding the movement of one or more devices while they were at or near the POI. In some cases, the movement classification data can be obtained by one or more of the client devices 1006a, 1006b while they were positioned at the POI.

The information contained within the fingerprint database 1008b can be used to distinguish one POI from other POIs. For example, for each POI, the fingerprint database 1008b can contain a particular set or combination of environmental measurements obtained at the POI (e.g., RSSI values for RF signals received from wireless access points at the POI), transaction event information regarding transactions conducted at the POI, and/or movement information regarding the movement of devices while they were positioned at the POI. As these sets of fingerprint data will likely differ for each POI (e.g., due to differences in the location and/or the nature of the POIs), these differences can be used to distinguish one POI from other POIs.

In some cases, the POI database 1008a and/or the fingerprint database 1008b might include incomplete sets of information regarding some or all of the candidate POIs. As an example, for a particular POI, the POI database 1008a might not include contact information regarding the POI, an indication of the hours of operation and/or the days of operation of the POI, a category or classification of the POI, and/or other content describing the POI. As another example, for a particular POI, the fingerprint database 1008b might not include environmental measurements obtained at the POI by one or more devices, transaction event information regarding one or more transactions conducted at the POI, information regarding the movement one or more devices while they were at the POI.

In a similar manner as described with respect to FIG. 5, location labels can be harvested from the client devices 1006a, 1006b. For example, the significant location can be learned and labeled using the methods described in reference to FIGS. 1-4. Client devices 1006a, 1006b upload the labels to server computer(s) 1004 through access points 1007a, 1007b and network 1002, where the labels data is stored by server computer(s) 1004 in the POI database 1008a. For example, if a significant location of a client device 1006a, 1006b corresponds to a particular POI, the label of the significant location can be associated with that POI in the POI database 1008a. Details about harvesting information from client devices are described in U.S. Pat. No. 9,646,318, filed Sep. 30, 2014 and issued May 7, 2017, and the contents of which are incorporated by reference herein in its entirety.

Further, the client devices 1006a, 1006b also upload fingerprint data to server computer(s) 1004, where the fingerprint data is stored by server computer(s) 1004 in the fingerprint database 1008b. For example, if a significant location of a client device 1006a, 1006b corresponds to a particular POI, the fingerprint data collected by the client device 1006a, 1006b at the significant location can be associated with that POI in the fingerprint database 1008b. This can include, for example, environmental measurements obtained at the significant location (e.g., RSSI values for RF signals received from wireless access points at the significant location), transaction event information regarding one or more transactions conducted at the significant location, and/or movement classification data obtained by the client device 1006a, 1006b while they were positioned at the significant location. Similar information can be collected from multiple different client devices for each of several different POIs, and aggregated together (e.g., to determine a consensus set of fingerprint data for each POI). For instance, if the server computer(s) 1004 receive multiple different environmental measurements for a particular POI, the server computer(s) 1004 can calculate an average of each of the dimensions of the measurement data, and determine a centroid vector that represents the POI.

Further, the server computer(s) 1004 can generate and/or update a probability distribution for one or more POIs based on the fingerprint data stored in the fingerprint database 1008*b*. For example, for each POI, the server computer(s) 1004 can determine the likelihood that a particular set of fingerprint data corresponds to that POI. Similar calculations can be performed over a spectrum or range of different sets of fingerprint data and/or with respect to multiple different POIs to determine one or more probability distributions. These probability distributions can be used to select a POI among one or more candidate POIs based on fingerprint data provided by a device requesting a location label, as described below.

Figure 11A:
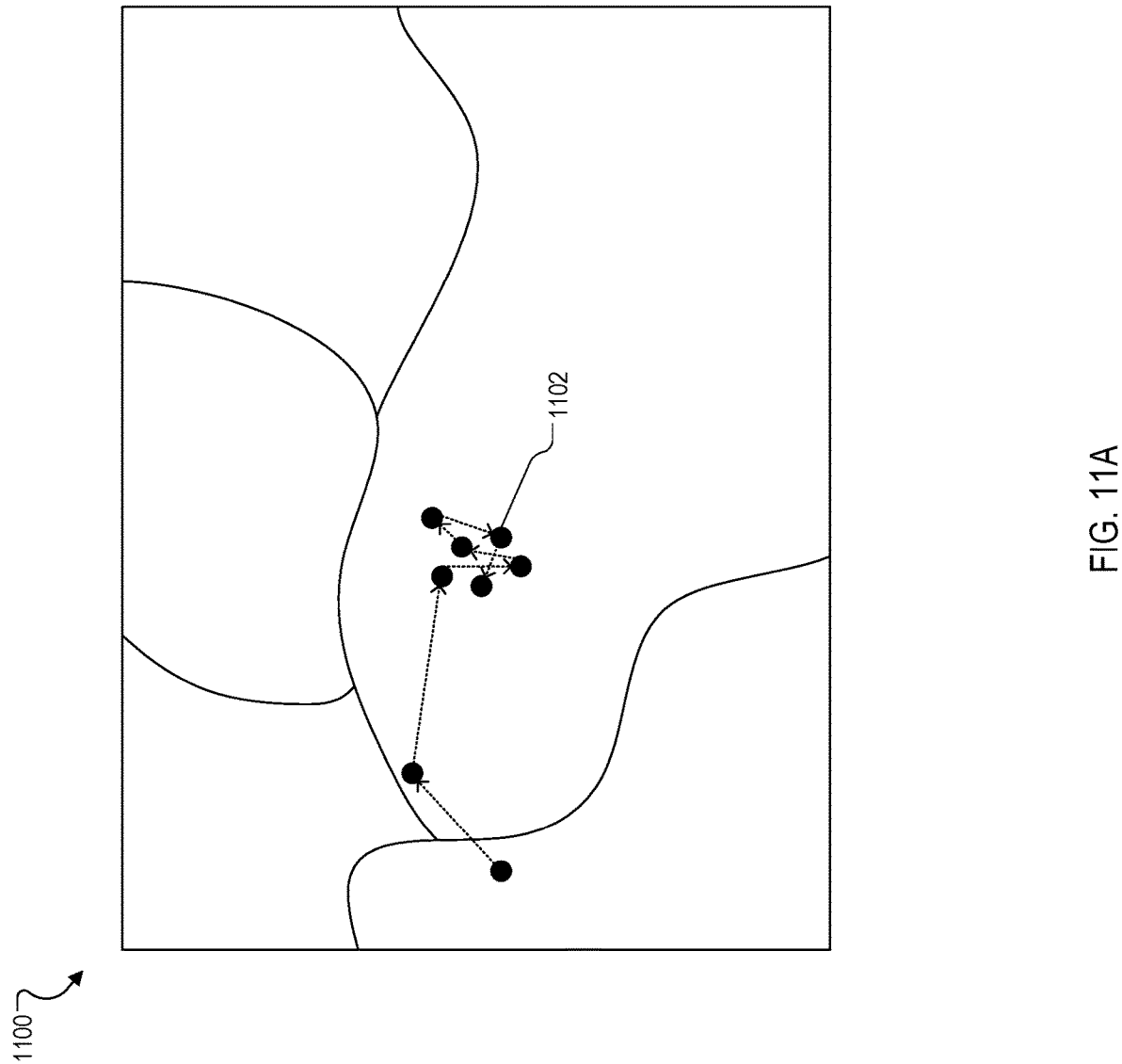
Figure 11C:
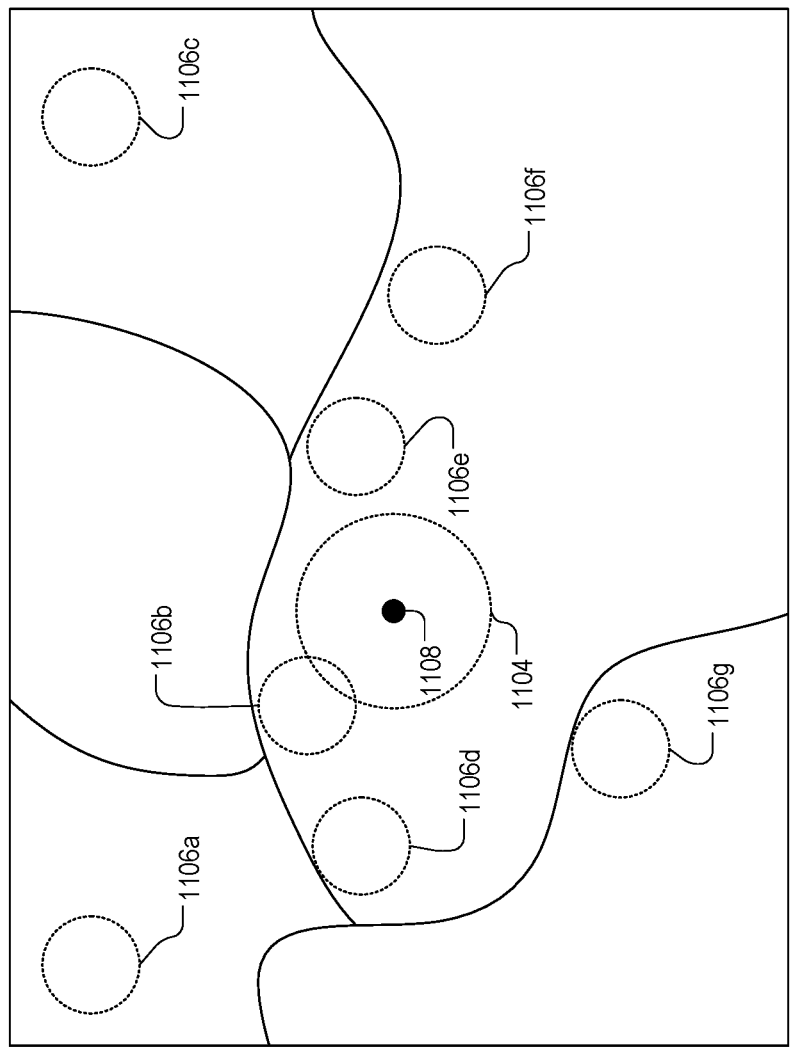

FIGS. 11A-11C show an example process of fulfilling requests for location labels using the system 1000. In some example implementation, a device can identify a significant location (e.g., using the techniques described herein), and request a location label from the server computer(s) 1004 to label the determined significant location.

FIG. 11A shows a map 1100 indicating a requesting device's locations 1102 over a period of time. The locations 1102 are ordered according to their timestamp. The requesting device's path between each location 1102 is indicated with dotted arrows.

As shown in FIG. 11B, in this example, the requesting device's location has settled into a localized area for a period of time, and has been identified as a significant location 1104 of the user of the requesting device (e.g., a cluster of locations). Example techniques for determining a significant location of a user of a device are described above.

The requesting device sends a request or query to the server computer(s) 1004 for a location label to associate with the significant location. The query includes a reference location of the requesting device (e.g., the significant location 1104 and/or a current location of the requesting device). The query can also include an indication of an accuracy or a reliability of the reference location (e.g., a confidence metric indicating how confident that the requesting device is that the reference location accurately describes the current location of the requesting device). The query can also include a set of fingerprint data obtained from the reference location of the requesting device. For example, the requesting device can send an indication of environmental measurements obtained at the location (e.g., RSSI values for RF signals received from wireless access points at the location), transaction event information regarding transactions conducted at the location, and/or movement information regarding the movement of the device at the location. The query can also include a timestamp indicating when the fingerprint data was obtained.

As shown in FIG. 11C, the server computer(s) 1004 determines, based on the POI database 1008*a*, one or more POIs 1106*a-g* that are geographically close to the location of the requesting device (e.g., one or more POIs that are geographically close to the geometric center of the significant location 1104). These POIs 1106*a-g* can be referred to as "candidate POIs."

In some cases, the server computer(s) 1004 can determine a fixed number of candidate POIs based on the location of the requesting device. For example, the server computer(s) 1004 can identify the N POIs nearest to the location of the requesting device as candidate POIs. In some cases, the server computer(s) 1004 can determine the POIs within a fixed number distance from the location of the requesting device. For example, the server computer(s) 1004 can identify all of the POIs within a distance d from the location of the requesting device as candidate POIs.

In some cases, the number of POIs selected can depend on the accuracy and/or reliability of the location of the requesting device. For example, if the location of the requesting device is relatively inaccurate or unreliable, the server computer(s) 1004 identify a larger number of candidate POIs. For instance, the server computer(s) 1004 can identify a larger number of POIs N nearest to the location of the requesting device or identify all of the POIs within a relatively longer distance d from the location of the requesting device. If the location of the requesting device is relatively accurate or reliable, the server computer(s) 1004 identify a smaller number of candidate POIs. For instance, the server computer(s) 1004 can identify a smaller number of POIs N nearest to the location of the requesting device or identify all of the POIs within a relatively shorter distance d from the location of the requesting device.

In some cases, the accuracy and/or reliability of the location of the requesting device can be represented by a radius r extending from the reference location of the requesting device. If the accuracy and/or reliability of the location is higher, the radius r can be smaller (representing a smaller circle around the reference location). If the accuracy and/or reliability of the location is lower, the radius r can be higher (representing a larger circle around the reference location). The server computer(s) 1004 can identify the POIs within the radius r around the reference location of the device, and designate those POIs as candidate POIs.

The server computer(s) 1004 determines the likelihood that each of the candidate POIs corresponds to the reference location of the mobile device. The likelihood of each candidate POI can be determined in various ways. If the fingerprint database 1008*b* includes a set of fingerprint data for a particular POI, the server computer(s) 1004 can determine a degree of similarity between the set of fingerprint data provided by the mobile device and the set of fingerprint data stored in the fingerprint database 1008 for that POI. For example, the server computer(s) 1004 can compare the set of fingerprint data received from the requesting device to the sets of fingerprint data for the candidate POIs, and calculate the likelihood that the set of fingerprint data corresponds to each respective POI based on the comparisons. In some cases, the server computer(s) can calculate, based on the probability distribution for the POI stored in the fingerprint database 1008*b*, the likelihood that the set of fingerprint data corresponds to that POI.

In some cases, a likelihood or confidence score can be calculated for each POI. As an example, if the set of fingerprint data is more likely to represent a particular POI, the likelihood score of that POI can be higher. If the set of fingerprint data is less likely to represent a particular POI, the likelihood score of that POI can be lower.

Further, candidate POIs that are sufficiently unlikely to correspond to the reference location of the mobile device can be filtered out, such that they are not considered further in connection with the query. Candidate POIs that are sufficiently likely to correspond to the reference location of the mobile device can be retained. For example, POIs having likelihood scores greater than or equal to a threshold likelihood score can be retained, while the remaining POIs can be filtered out.

In some cases, if the fingerprint database 1008b does not include a set of fingerprint data for a particular candidate POI, the server computer(s) 1004 can determine whether to filter out that candidate POI based on the likelihood scores of other candidate POIs neighboring that candidate POI. As an example, if a neighboring candidate POI has a sufficiently high likelihood score, the candidate POI can be retained. To illustrate, two neighboring POIs "POI1" and "POI2" can be designated as candidate POIs. In this example, the fingerprint database 1008b includes a set of fingerprint data for POI1, but does not include any fingerprint data for POI2. If the POI1 has a sufficiently high likelihood score (e.g., the set of fingerprint is sufficiently similar to the set of fingerprint data provided by the requesting device), both POI1 and POI2 can be retained. Otherwise, both POI1 and POI2 can be filtered out.

In some cases, two candidate POIs can be considered "neighbors" if they are sufficiently close to one another. For instance, if the distance between two candidate POIs is less than or equal to a threshold distance $d_{threshold}$, the candidate POIs can be identified as neighbors. Accordingly, if one candidate POI has a sufficiently high likelihood score, the other candidate POI can be retained, even if no fingerprint data is available for that POI. However, if the distance between two candidate POIs is greater than the threshold distance $d_{threshold}$, the candidate POIs are not identified as neighbors. Accordingly, even if one candidate POI has a sufficiently high likelihood score, the other candidate POI is filtered out. In practice, $d_{threshold}$ can vary, depending on the implementation.

In some cases, if the fingerprint database 1008b does not include a set of fingerprint data for a particular candidate POI, the server computer(s) 1004 can interpolate a likelihood score for that candidate POI based on the likelihood scores of other candidate POIs for which the fingerprint database 1008b includes sets of fingerprint data. As an example, POIs "POI1," "POI2," "POI3," and "POI4" can be designated as candidate POIs. In this example, the fingerprint database 1008b includes a set of fingerprint data for each of POI1, POI2, and POI3, but does not include any fingerprint data for POI4. The likelihood score for POI4 can be interpolated based on the likelihood scores for POI2, POI3, and POI4.

In some cases, a likelihood score can be interpolated based on the geographical locations for each of the candidate POIs for which the fingerprint database 1008b includes sets of fingerprint data. As an illustrative example, POIs "POI1," "POI2," "POI3," and "POI4" can be designated as candidate POIs. In this example, the fingerprint database 1008b includes a set of fingerprint data for each of POI1, POI2, and POI3, but does not include any fingerprint data for POI4. POI4 is geographically located in a triangle formed by POI1, POI2, and POI3 (e.g., with POI1, POI2, and POI3 positioned at the vertices of the triangle). Radio measurements at POI4 can be interpolated in linear scale based on a distance from POI4 to each of the POI1, POI2, and POI3, using radio measurements at each location. The location fingerprint can be a set of interpolated radio measurements per each radio access points that are observed among POI1, POI2, and POI3.

In some cases, a likelihood score can be interpolated based on a subset of the candidate POIs for which the fingerprint database 1008b includes sets of fingerprint data. For example, when calculating a likelihood score for a POI without a set of fingerprint data, the server computer(s) 1004 can interpolate the likelihood scores of the k highest scoring candidate POIs for which fingerprint data is available. In practice, k can vary, depending on the implementation.

In some cases, a likelihood score can be determined for the candidate POI based on a geographical proximity between the candidate POI and the reference location of the requesting device. For example, a candidate POI that is closer to the reference location of the requesting device can be assigned a higher likelihood score. As another example, a candidate POI that is farther to the reference location of the requesting device can be assigned a lower likelihood score.

In some cases, two likelihood scores can be calculated for each candidate POI. A first likelihood score can be calculated based on the set fingerprint data provided by the requesting device (e.g., as described above). A second likelihood score can be calculated based on a geographical distance between the reference location of the requesting device and the location of a candidate POI. The two scores can be reconciled or combined to determine a single likelihood score for a candidate POI. In some cases, the higher of the first likelihood score and the second likelihood score can be selected as the likelihood for the candidate POI.

As an example, for each candidate POI for which a set of fingerprint data is available, a first likelihood score can be calculated based on a similarly between the set of fingerprint data provided by the requesting device and the set of fingerprint data for the candidate POI. Further, for each candidate POI, a second likelihood score can be calculated based on a geographical distance between the reference location of the requesting device and the location of a candidate POI. For each candidate POI, a single likelihood score can be determined for that candidate POI by selecting the higher of the first likelihood score and the second likelihood score.

Further, the candidate POIs can be ranked according to their likelihood scores. For example, each of the candidate POIs can be sorted based on their likelihood scores, such that candidate POIs having higher likelihood scores are higher in rank, and candidate POIs having lower likelihood scores are lower in rank.

In some cases, the ranking of the candidate POIs can be modified or "re-shuffled" based on contextual data regarding each POI. For example, in some cases, the ranking of the candidate POIs can be modified based on hours or operation and/or days of operation of each of the POIs. For instance, the server computer(s) 1004 can retrieve information regarding each candidate POI from the POI database 1008a to determine whether each POI is open or business or closed. In a similar manner as described above with respect to the context analyzer 212, candidate POIs that are open for business can be favored over candidate POIs that are closed. For example, the likelihood score for candidate POIs that are open for business can be increased. As another example, the likelihood score for candidate POIs that are closed can be decreased. The amount that a likelihood score is increased and/or decreased can vary, depending on the implementation.

As another example, the ranking of the candidate POIs can be modified based on a popularity of each of the POIs. In some cases, the popularity of a POI can correlate to a number of times that the POI was visited by one or more users in the past (e.g., the users of harvested devices). In some cases, the popularity of a POI can correlate to a number of times that the POI was the subject of a search request (e.g., a search query input into a search engine). This information can be stored in the POI database 1008a, and the server computer(s) 1004 can retrieve information regarding each candidate POI from the POI database 1008a to determine a popularity of each POI. In a similar manner as described above with respect to the context analyzer 212, candidate POIs that are more popular can be favored over candidate POIs that are less popular. For example, the likelihood score for candidate POIs that are more popular can be increased. As another example, the likelihood score for candidate POIs that are less popular can be decreased. The amount that a likelihood score is increased and/or decreased can vary, depending on the implementation. In some cases, amount that the likelihood score is increased and/or decreased can scale linearly with a popularity of the candidate POI. In some cases, the amount can scale non-linearly with popularity (e.g., scale according to a common logarithm of popularity).

As another example, the ranking of the candidate POIs can be modified based on a favorability of each of the POIs. In some cases, the favorability of a POI can be determined based on user rankings, reviews, or opinions. For example, one or more users can submit reviews, rankings, or opinions describing their experience with one or more POIs. This can include, for instance, submitting numerical scores (e.g., points, "thumbs ups," or "stars") to each POI. This information can be stored in the POI database 1008a, and the server computer(s) 1004 can retrieve information regarding each candidate POI from the POI database 1008a to determine a favorability of each POI. In a similar manner as described above with respect to the context analyzer 212, candidate POIs that are more favorable among users can be favored over candidate POIs that are less favorable. For example, the likelihood score for candidate POIs that are more favorable can be increased. As another example, the likelihood score for candidate POIs that are less favorable can be decreased. The amount that a likelihood score is increased and/or decreased can vary, depending on the implementation.

As another example, the ranking of the candidate POIs can be modified based on the heading of the requesting device. The heading of the requesting device can be determined, for example, using compass data obtained by the requesting device and/or based on a movement trajectory of the requesting device. In a similar manner as described above with respect to the context analyzer 212, if the heading of the requesting device favors a particular POI, that POI can be favored over others. For example, if the requesting device is facing a particular POI (e.g., a center of the POI), the likelihood score of that POI can be increased).

As another example, the ranking of the candidate POIs can be modified based a category of each of the POIs. For instance, a POI can be categorized based on the type of business associated with the POI or a classification of the POI. As an example, if a user is more likely to be at a particular category of POIs than others, the likelihood score for candidate POIs of that category can be increased. As another example, if a user is more likely to be at a particular category of POIs than others, the likelihood score for candidate POIs not of that category can be decreased. In a similar manner as described above with respect to the context analyzer 212, the likelihood that a user is at a particular category of POIs can depend on the time of day and/or a day of the week. Further, the likelihood that a user is at a particular category of POIs can depend on the preferences to a user. Further still, the user's behavior with respect to certain times of the day, days of the week, and/or dates in the year also can be considered in determining a user's preferences.

After the ranking of the candidate POIs is modified, the server computer(s) 1004 transmits some or all of the candidate POIs to the requesting device. For example, the server computer(s) can send the location labels associated with some or all of the candidate POIs to the requesting device, along with the likelihood scores associated with each of the candidate POIs. In addition, the server computer(s) 1004 can also transmit information from the POI database 1008a and/or fingerprint database 1008b regarding some or all of the candidate POIs.

In some cases, the server computer(s) 1004 can transmit only highest scoring or highest ranking candidate POI to the requesting device. For example, the server computer(s) 1004 can transmit only the candidate POI that is most likely to correspond to the location of the requesting device. In some cases, the server computer(s) 1004 can transmit multiple candidate POIs to the requesting device. For example, the server computer(s) 1004 can transmit the N highest scoring or ranking candidate POIs. In some cases, the server computer(s) 1004 can transmit only the POIs having a sufficient high score or rank. For example, the server computer(s) 1004 can withhold any candidate POIs having a score or rank below a pre-defined threshold value.

The requesting device can assign a label to the significant location 1004 based on the information received from the server computer(s) 1004. For example, in some cases, the request device can assign the label associated with the highest scoring candidate POI to the significant location 1004. This can be useful, for example, as it enables the requesting device to determine locations for significant locations based on crowdsourced data from one or more users.

Further, the requesting device can use the information received from the server computer(s) 1004 to provide various location-dependent features to the user of the requesting device. For example, the requesting device can render a map for a user with indication of the user's current location, retrieve content relevant to the user's current location, record the user's current location, share the user's current location with others, or perform other location-dependent functions.

In some cases, the requesting device can consider additional information in labeling a significant location. For example, the label received from the server computer(s) 1004 can be considered as a candidate label for the significant location. Further, one or more context data sources (e.g., the contextual data sources 214 shown in FIGS. 2B and 3A) can provide contextual data points for identifying one or more additional candidate labels for the significant location. The context analyzer of the requesting device (e.g., the context analyzer 212 shown in FIGS. 2B and 3A) can identify multiple candidate labels for a significant location based on the contextual data points. The context analyzer can disambiguate and resolve the multiple contextual data points to identify one of the multiple candidate labels as having the highest likelihood of being the label for the significant location.

For example, the context analyzer can identify multiple candidate labels for a significant location, and select one of the labels if more than half of the contextual data points identify that label as being the label of the significant location. As another example, the context analyzer can assign a respective weight to each candidate labels. The weights can be the same or different. For example, a contextual data point received from a maps application can be given more weight than a contextual data point received from a text messaging application. To resolve the multiple candidate labels to one label, the context analyzer can execute a weighted algorithm that considers the respective weight given to each contextual data point.

An example weighting tabling is shown in TABLE II.

TABLE II

Example Contextual Data Weighting

| Contextual Data Type | Weight | Description |
|---|---|---|
| Reverse Geocode | 1 | Label obtained from converting a point location (e.g., latitude and longitude to the requesting device) to an address or place name. |
| Forward Geocode | 1 | Label obtained from converting an address or place name (e.g., corresponding to the location of the requesting device) into a point location. |
| Place names recognized in text | 1 | Label obtained by searching in the vicinity of the learned location for POI names similar to place names the user of the requesting device has typed recently.<br>For example, the user may have sent a text message, "Want to meet at Bill's Coffee?" and then later gone to the vicinity of a business named "Bill's Coffee." |
| Historical Learned Place | 5 | Label obtained by comparing the location of a new location, not yet labeled, to the location of a previously known location that already has a label. In some cases, in the absence of additional information, it is likely that the user returned to the same POI where they went before. |
| Donation from applications | 5 | Label provided explicitly by an application (e.g., on the requesting device). The operating system (e.g., of the requesting device) may provide an API to allow applications to "donate" their knowledge of places in which the user is interested or is expected to go.<br>For example, a user may use a ride-sharing application to book a ride to a particular place. The ride-sharing app may then call the API to inform the system of the user's interest in the POI for that place. If the user then appears in the vicinity of that POI, it is likely that they were actually at that POI. Other example applications include directory applications, social media applications, shopping applications, travel applications, among others. |
| Local Search | 7 | Label associated with a search conducted by a user of the requesting device (e.g., a search query input into a search engine). |
| Calendar events | 9 | Label obtained from a calendar event, correlated to the observed location of the user of the requesting device (e.g., the location of the requesting device) based on the time of the event and the proximity of the user's location at that time to the location indicated in the event. |
| Reminders at a place | 9 | A reminders or task-management application, such as the Reminders application from Apple for iOS and macOS, may allow the user to receive a reminder notification at a particular time and/or place. A label may be obtained by comparing the observed location of the user (e.g., the location of the requesting device) to the place indicated by such a reminder. |
| Harvested Label | 11 | Label obtained from a label harvesting system, such as system 500 or 1000. |
| Historical Entry Place Display | 13 | Label obtained from the history of place searches the user of the requesting device has performed in a mapping application. |
| Historical Entry Route | 13 | Label obtained from the source or destination of a navigation session in a mapping application. |
| User | 15 | Label obtained directly from the user through an appropriate UI in an application (e.g., on the requesting device).<br>For example, an application may allow the user to "check in" to a place where they currently are or have been in the past. An application may also display to the user an area where he was previously observed to be and allow the user to indicate which POI that location corresponds to. |
| Contacts | 15 | Label associated with a contact of a user of the requesting device (e.g., the name of a business contained within the user's contact list). |

TABLE II-continued

Example Contextual Data Weighting

| Contextual Data Type | Weight | Description |
| --- | --- | --- |
| Favorite | 15 | Label for a location designated as a "favorite" location by a user of the requesting device. |

For example, as shown in TABLE II, the requesting device can obtain one or more candidate labels from one or more contextual data sources. Certain types of contextual data can be weighed more than others. For instance, contextual data having lower weights can have relatively lower influence on determining a label, while contextual data having higher weights can have relatively higher influence on determining a label. As examples, higher weights can correspond to contextual data that are more likely to accurately reflect the location of the mobile device and/or be of greater importance to a user (e.g., a label associated with a location at which a user "checked in," a label associated with the location of a user's contact, a label associated with a "favorite" location of the user, and so forth. Comparatively lower weights can correspond to contextual data that are comparatively less likely to accurately reflect the location of the mobile device and/or be of comparatively lesser importance to a user (e.g., labels associated with searches conducted by the user, harvested labels, and so forth). Even lower weights can correspond to contextual data that are less likely still to accurately reflect the location of the mobile device and/or be of even lesser importance to a user (e.g., labels obtained using reverse geocoding, labels obtained using forward geocoding, and so forth). Thus, although different types of contextual data can have varying degrees of accuracy and/or importance to a user, each can be considered in determining a personalized or device-specific label for a significant location (e.g., a label reflecting the behavior of the user).

In some cases, each candidate label can be assigned a score based on the type of contextual data corroborating that label. For example, a "Label 1" can be assigned a score of 26 if "Label 1" is corroborated by a label harvesting system and a user's designation of a "favorite" location (11+15=26). As another example, a "Label 2" can be assigned a score of 8 if "Label 2" is corroborated by reverse geocoding and a search conducted by the user (1+8=9). As "Label 1" received the highest total weighting, it can be selected over "Label 2" as the label for the significant location.

Although example types of contextual data and corresponding weights are shown in TABLE II, these are merely illustrative examples. In practice, additional types of contextual data can be considered, either instead or in addition to those shown in TABLE II. Further, in practice, different weights can be used than those shown in TABLE II. In some cases, the weights can be empirically adjusted or "tuned" to provide more accurate labels.

In some cases, the server computer(s) 1004 can also determine whether a requesting device is within an area of interest (AOI). AOIs could be, for instance, regions that contain one or more POIs within it. As examples, an AOI could be a shopping mall that contains one or more individual POIs within it (e.g., stores). As another example, an AOI could be a shared office building that contains one or more individual POIs within it (e.g. individual businesses). An AOI can be defined by a geographical boundary (e.g., a perimeter line enclosing the AOI).

In some cases, if the server computer(s) 1004 determines that the requesting device is at a particular candidate POI, the server computer(s) 1004 can determine whether the candidate POI is enclosed within an AOI. If so, the server computer(s) 1004 can provide a label of the AOI, either instead of or in addition to the label of the POI. In a similar manner as described within respect to POIs, location labels for AOIs can be harvested from one or more harvested devices, such that crowd sourced location labels can be determined based on user data.

Merging POIs and AOIs

In some cases, data pertaining to two or more POIs and/or AOIs in the databases 1008a, 1008b can be merged together into a single POI and/or AOI. For example, the databases 1008a, 1008b can include separate records for a first "POI1" and the second "POI2." If it is later determined that "POI1" and "POI2" actually refer to the same POI, data from the "POI1" and the "POI2" can be merged into a common POI. This can be useful, for example, in improving the accuracy of the databases 1008a, 1008b. Further, this can reduce data redundancy, which can improve the performance of a harvesting system.

Figure 12A:
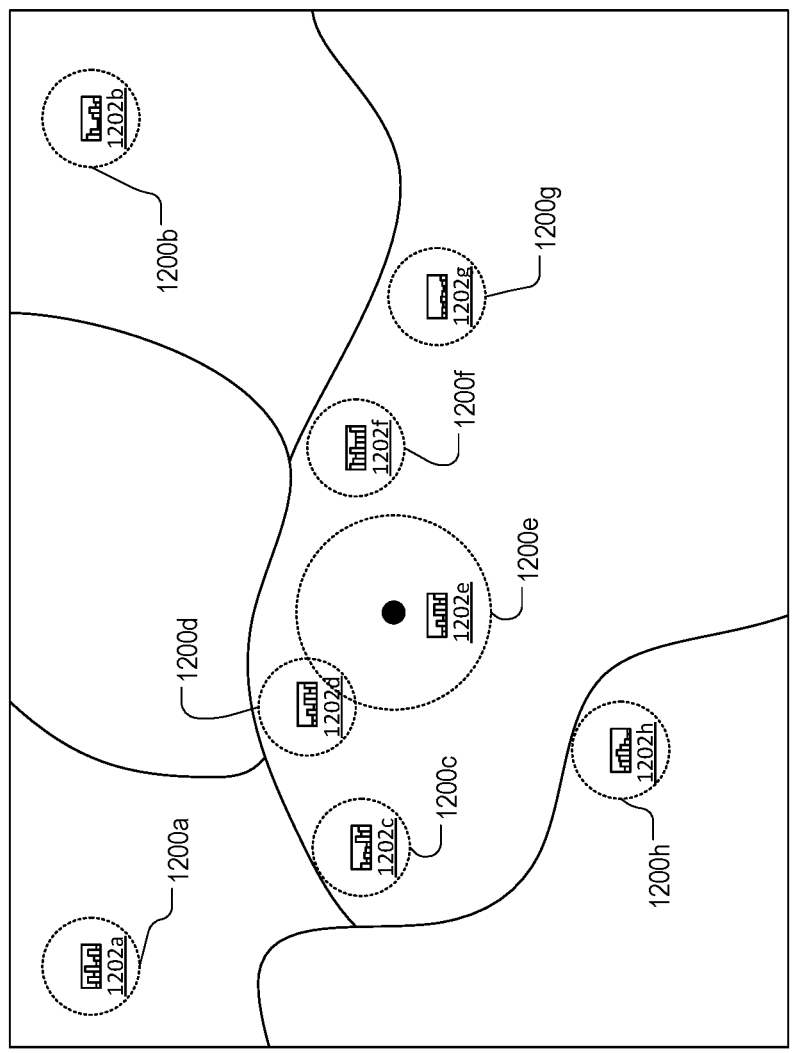
FIGS. 12A-12B show an example process of merging points of interest.
Figure 12B:
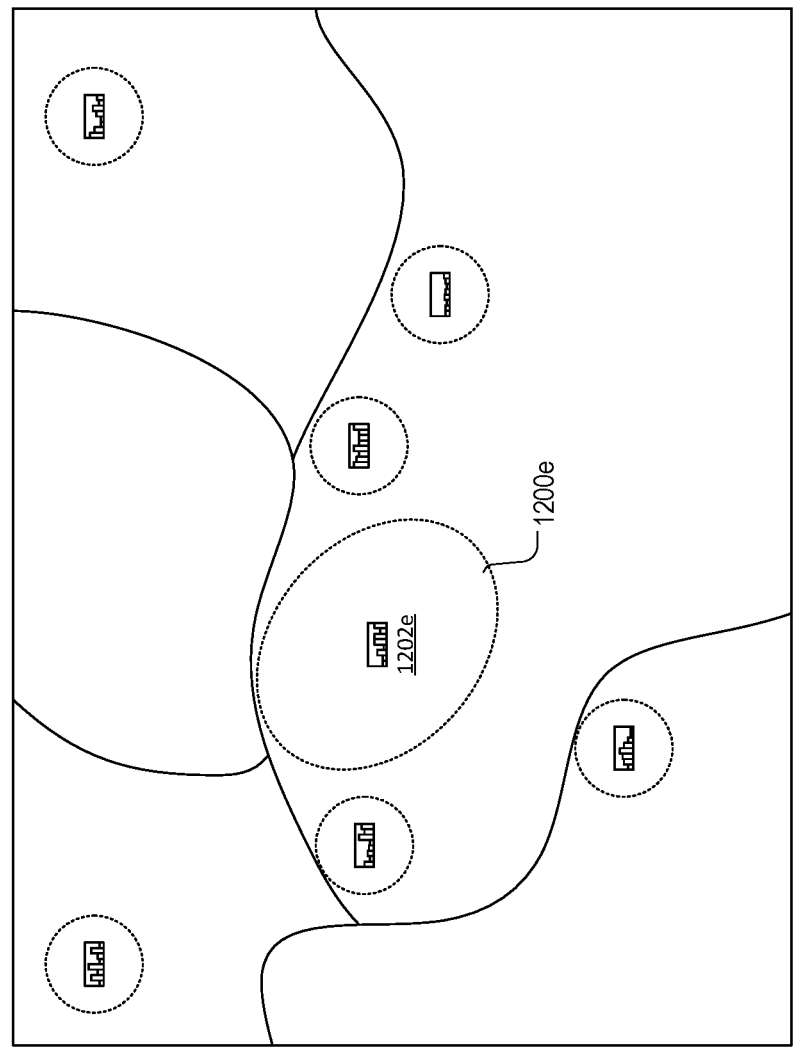

For example, FIG. 12A shows a map 1200 indicating several POIs 1200a-h and their corresponding sets of fingerprint data 1202a-h. As shown in FIG. 12A, the set of fingerprint data 1202d (corresponding to POI 1200d) is similar to the set of fingerprint data 1202e (corresponding to POI 1200e). As shown in FIG. 12B, the POI 1200d and the POI 1200e can be merged into a common POI 1200e.

Merging two or more POIs can include combining the data for the POIs in each of the databases 1008a, 1008b. For example, POI data for the POIs can be aggregated, and a consensus set of POI data can be determined for the combined POI. As another example, fingerprint data for the POIs can be aggregated, and a consensus set of fingerprint data can be determined for the combined POI. Merging two or more POIs could also include modifying a boundary associated with the common POI, such that the boundary encloses the two or more original POIs.

Modifying POI and AOI Boundaries

In some cases, the boundaries of one or more POIs and/or AOIs can be modified based on information received from the harvested devices and/or the requesting devices. For instance, boundaries of one or more POIs can be modified based on likelihood scores generated during by the harvest system 1000 when fulfilling requests for location labels.

Figure 13A:
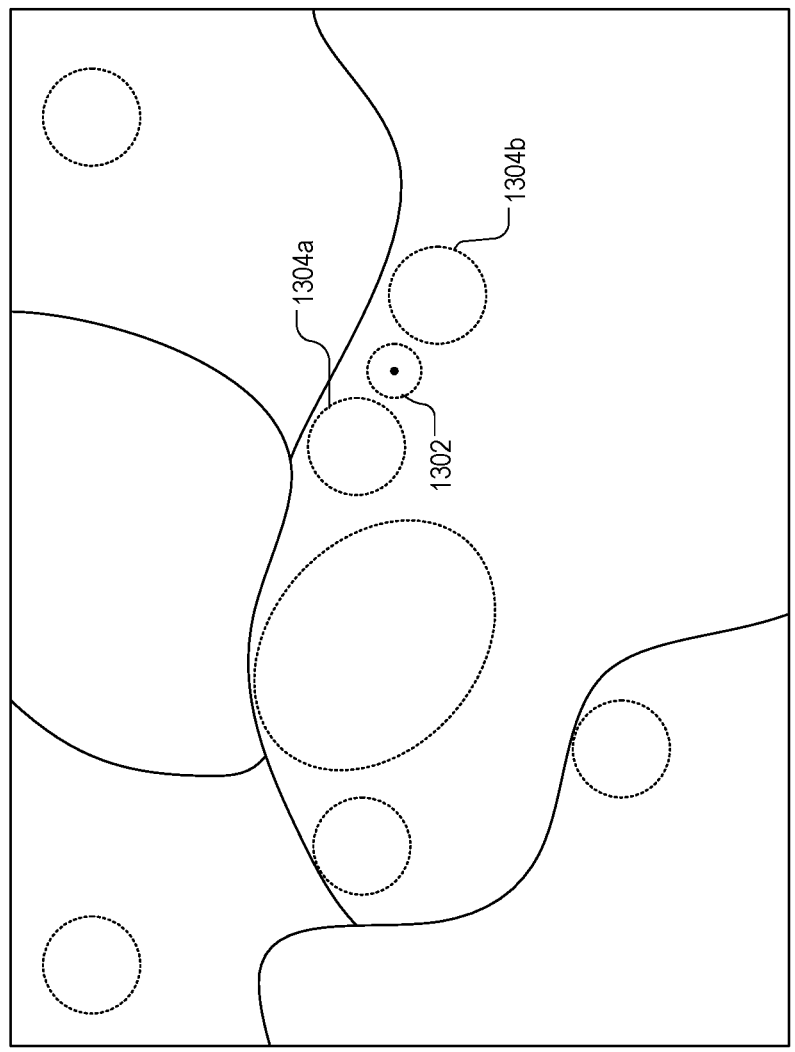
FIGS. 13A-13B show an example process of modifying boundaries of point of interest.
Figure 13B:
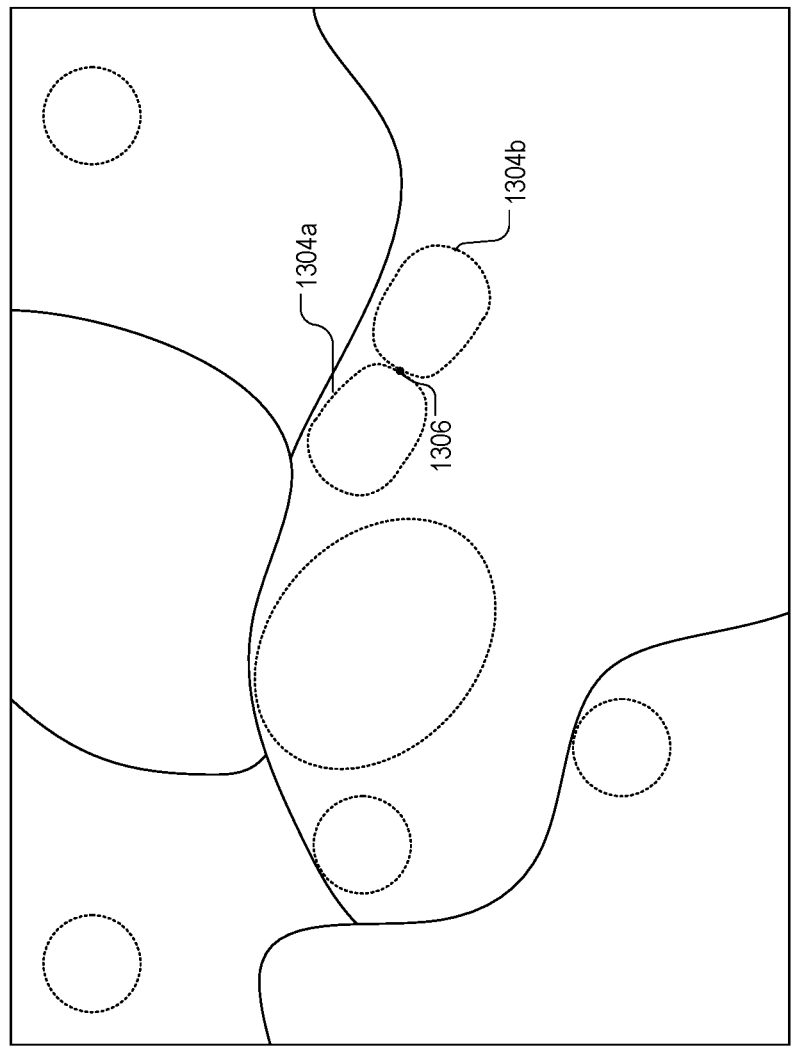

For example, as shown in FIG. 13A, a requesting device can be located at a significant location 1302 next to two POIs 1304a and 1304b. As described above with respect to FIG. 10, the requesting device can request the location label for a significant location from the harvesting system 1000. If the harvesting system 1000 determines that both of the POIs 1304a and 1304b has an equal or nearly equal likelihood score with respect to the significant location, the harvesting system 1000 can modify the boundaries of the POIs 1304*a* and 1304*b*, such that the position of the requesting device 1306 is on the boundary between the two POIs. For example, as shown in FIG. 13B, the boundary of POI 1304*a* and the boundary of the POI 1304*b* both pass through the location of the requesting device. This can be useful, for example, in determining more accurate boundaries between POIs.

Additional Example Labels Harvesting Processes

Figure 14:
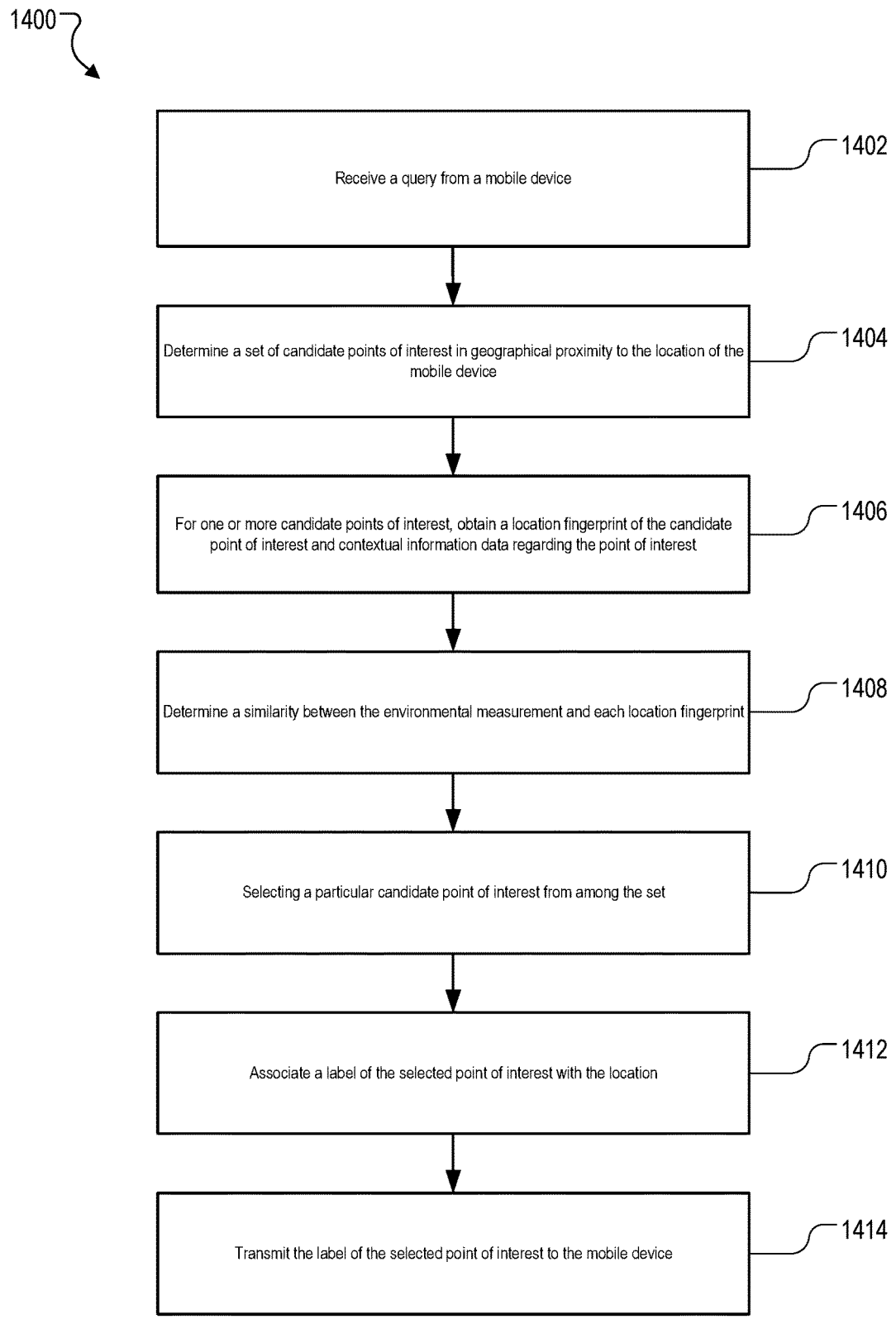
FIG. 14 is a flowchart of an example process for serving labels for locations performed by one or more server computers.

FIG. 14 is a flowchart of an example process 1400 for serving labels for locations performed by one or more server computers. Process 1400 can be performed, for example, using one or more of the components shown in FIG. 10 (e.g., the server computer(s) 1004). An example execution of the process 1400 is shown, for example, in FIGS. 11A-11C.

A query from a mobile device is received at a computer system (step 1402). As an example, a query can be received from a client device 1006*a* or 1006 shown in FIG. 10. The query can include an indication of a location of the mobile device, and an environmental measurement obtained by the mobile device at the location. As an example, the query can include geographical coordinates identifying the location of the mobile device, such as a significant location of the mobile device and/or a cluster of locations of the mobile device. In some cases, the location can correspond to a cluster of ordered locations of the mobile device (e.g., a sequence of locations, ordered according to their timestamps). The environmental measurement can include fingerprint data obtained at the location, such as indications of one or more wireless access points previously detected at the respective candidate point of interest, and an indication of a signal strength associated with each wireless access point. The query can also include transaction event information regarding transactions conducted at the location and/or movement information regarding the movement of the device at the location.

A set of candidate points of interest in geographical proximity to the location is determined (step 1404). In some cases, the computer system can identify the N POIs nearest to the location of the requesting device as candidate POIs. In some cases, the computer system can determine the POIs within a fixed number distance from the location of the requesting device. For example, the computer system can identify all of the POIs within a distance d or radius r from the location of the requesting device as candidate POIs. In some cases, the radius r can be determined based on an accuracy or a reliability of the location provided by the mobile device.

For each of one or more candidate points of interest of the set, a location fingerprint of the candidate point of interest and contextual data regarding the candidate point of interest is obtained (step 1406). As an examples, fingerprint data can include environmental measurements obtained at or near the POI by one or more devices, transaction event information regarding one or more transactions conducted at the POI and/or information regarding the movement of one or more devices while they were at or near the POI. As examples, the contextual data regarding the candidate point of interest can include an hours of operation of the candidate point of interest, a days of operation of the candidate point of interest, a popularity of the candidate point of interest, and/or a favorability of the candidate point of interest.

A similarity between the environmental measurement and each location fingerprint is determined (step 1408).

A particular candidate point of interest is selected from among the set (step 1410). The particular candidate point of interest can be selected based on the similarity between the environmental measurement and each location fingerprint, and based on an assessment of the contextual data.

Selecting the particular candidate point of interest from among the set can include determining, for each candidate point of interest of the set, a respective likelihood score. Each likelihood score can represent a likelihood that the location corresponds to the candidate point of interest. Determining a respective likelihood score can include calculating an initial likelihood score based on a similarity between the environment measurement and the location fingerprint of the candidate point of interest, and subsequent to calculating the initial likelihood score, modifying the initial likelihood score based on the contextual data of the candidate point of interest. Determining a likelihood score can also include determining a particular candidate point of interest of the set not associated with a location fingerprint, and calculating an initial likelihood score for that candidate point of interest based on an interpolation of one or more likelihood scores for one or more other candidate points of interest of the set.

A label of the selected point of interest is associated with the location (step 1412). For example, a label describing the selected point of interest (e.g., a textual label harvested from one or more other mobile devices) can be assigned with the location.

The label of the selected point of interest is transmitted to the mobile device (step 1414). In some cases, the computer system can transmit only highest scoring or highest ranking candidate POI to the mobile device. For example, the computer system can transmit only the candidate POI that is most likely to correspond to the location of the mobile device. In some cases, the computer system can transmit multiple candidate POIs to the mobile device. In some cases, the computer system can transmit only the POIs having a sufficient high score or rank.

The mobile device can assign a label to the location based on the information received from the computer system. For example, in some cases, the mobile device can assign the label associated with the highest scoring candidate POI to the location. Further, the mobile device can use the information received from the computer system to provide various location-dependent features to the user of the requesting device. For example, the computer device can render a map for a user with indication of the user's current location, retrieve content relevant to the user's current location, record the user's current location, share the user's current location with others, or perform other location-dependent functions.

In some cases, one or more additional candidate points of interest can be identified based on the likelihood scores. Identifying additional candidate points of interest can include determining an additional point of interest not associated with a location fingerprint and in geographical proximity to the location, and determining that the additional point of interest is within a threshold distance of a candidate point of interest of the set having a likelihood score greater than a threshold likelihood value. The additional point of interest can be included in the set.

In some cases, the location fingerprint of the selected point of interest can be modified based on the environment measurement. For example, the environment measurement provided by the mobile device can be used to calculate an updated location fingerprint of the selected point of interest.

In some cases, a boundary of the selected point of interest can be modified based on the similarity between the environment measurement and the location fingerprint of the selected point of interest and the contextual data of the selected point of interest. Examples of this modification are shown and described with respect to FIGS. 12A, 12B, 13A, and 13B.

In some cases, the mobile device can determine a device-specific label of the location based on one or more labeling criteria. The labeling criteria can include the label transmitted by the computer system. The labeling criteria can include contact information associated with a user of the mobile device, a search history associated with the user, a location history associated with the user, geocoded information, a transaction history associated with the user, and/or messages transmitted to the user by one or more other users and/or received by the user from one or other users.

In some case, determining the device-specific label of the location can include assigning a respective weight to each criterion of the labeling criteria. Determining the device-specific label of the location at the mobile device can also include determining one or more additional labels based on the plurality of labeling criteria, and determining a score for the label transmitted by the computer system and each additional label based on the weights.

Exemplary Device Architecture

Figure 15:
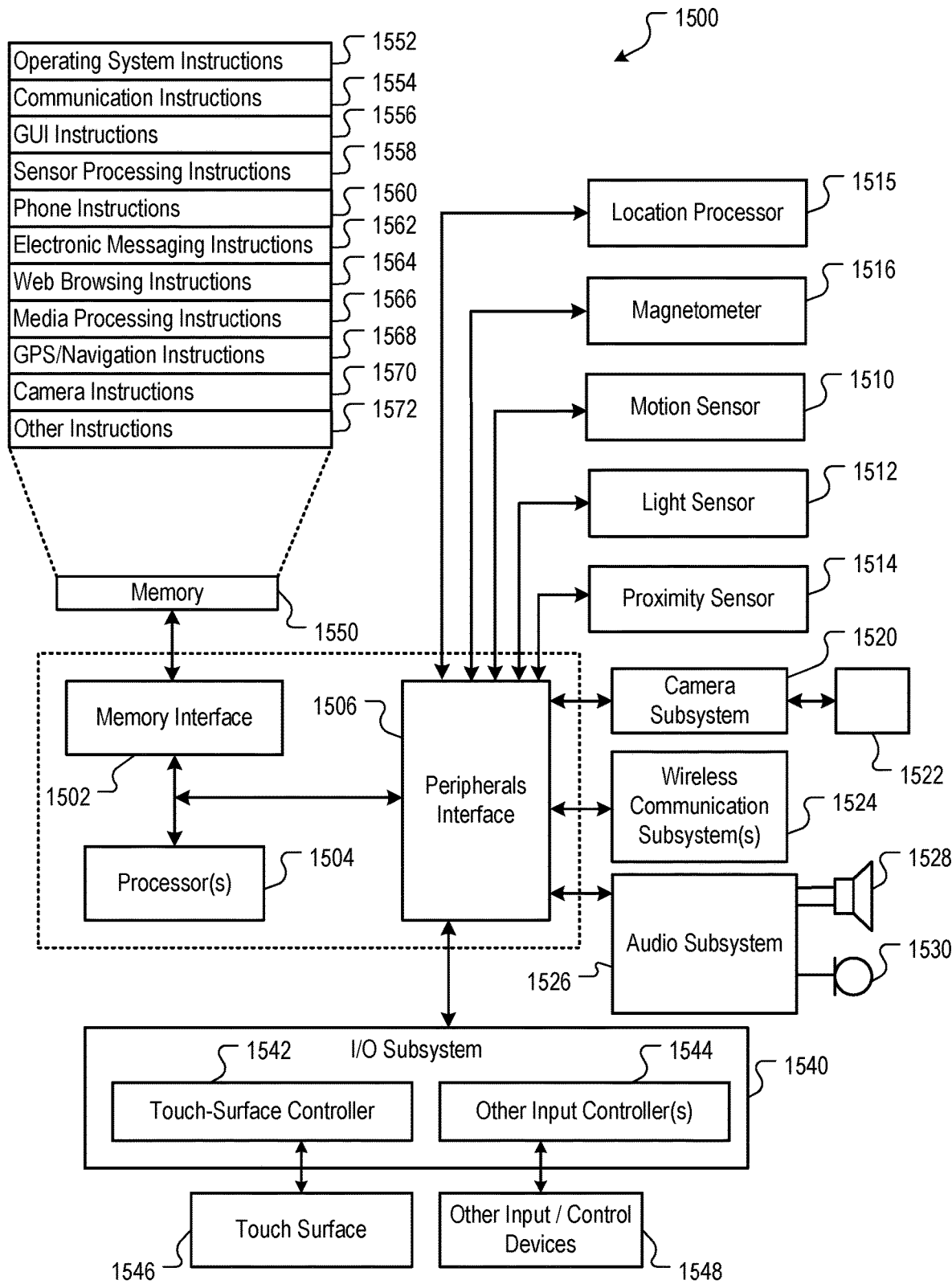
FIG. 15 is a block diagram of an example device architecture for implementing the features and processes described in reference to FIGS. 1-14.

FIG. 15 is a block diagram of example device architecture for implementing the features and processes described in reference to FIGS. 1-14. Architecture 1500 may be implemented in any computing device for generating the features and processes described in reference to FIGS. 1-14, including but not limited to smart phones and wearable computers (e.g., smart watches, fitness bands). Architecture 1500 may include memory interface 1502, data processor(s), image processor(s) or central processing unit(s) 1504, and peripherals interface 1506. Memory interface 1502, processor(s) 1504 or peripherals interface 1506 may be separate components or may be integrated in one or more integrated circuits. One or more communication buses or signal lines may couple the various components.

Sensors, devices, and subsystems may be coupled to peripherals interface 1506 to facilitate multiple functionalities. For example, motion sensor 1510, light sensor 1512, and proximity sensor 1514 may be coupled to peripherals interface 1506 to facilitate orientation, lighting, and proximity functions of the device. For example, in some implementations, light sensor 1512 may be utilized to facilitate adjusting the brightness of touch surface 1546. In some implementations, motion sensor 1510 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 1506, such as a temperature sensor, a barometer, a biometric sensor, or other sensing device, to facilitate related functionalities. For example, a biometric sensor can detect fingerprints and monitor heart rate and other fitness parameters.

Location processor 1515 (e.g., GNSS receiver chip) may be connected to peripherals interface 1506 to provide geo-referencing. Electronic magnetometer 1516 (e.g., an integrated circuit chip) may also be connected to peripherals interface 1506 to provide data that may be used to determine the direction of magnetic North. Thus, electronic magnetometer 1516 may be used as an electronic compass.

Camera subsystem 1520 and an optical sensor 1522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1524. Communication subsystem(s) 1524 may include one or more wireless communication subsystems. Wireless communication subsystems 1524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 1524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 1524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 1526 may be coupled to a speaker 1528 and one or more microphones 1530 to facilitate voice-enabled functions, such as voice recognition, voice replication, digital recording, and telephony functions.

I/O subsystem 1540 may include touch controller 1542 and/or other input controller(s) 1544. Touch controller 1542 may be coupled to touch surface 1546. Touch surface 1546 and touch controller 1542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 1546. In one implementation, touch surface 1546 may display virtual or soft buttons and a virtual keyboard, which may be used as an input/output device by the user.

Other input controller(s) 1544 may be coupled to other input/control devices 1548, such as one or more buttons, rocker switches, thumb-wheel, infrared port, USB port, and/or a pointer device such as a stylus. The one or more buttons (not shown) may include an up/down button for volume control of speaker 1528 and/or microphone 1030.

In some implementations, device 1500 may present recorded audio and/or video files, such as MP3, AAC, and MPEG video files. In some implementations, device 1500 may include the functionality of an MP3 player and may include a pin connector for tethering to other devices. Other input/output and control devices may be used.

Memory interface 1502 may be coupled to memory 1550. Memory 1550 may include high-speed random access memory or non-volatile memory, such as one or more magnetic disk storage devices, one or more optical storage devices, or flash memory (e.g., NAND, NOR). Memory 1550 may store operating system 1552, such as Darwin, RTXC, LINUX, UNIX, OS X, iOS, WINDOWS, or an embedded operating system such as VxWorks. Operating system 1552 may include instructions for handling basic system services and for performing hardware dependent tasks. In some implementations, operating system 1552 may include a kernel (e.g., UNIX kernel).

Memory 1550 may also store communication instructions 1554 to facilitate communicating with one or more additional devices, one or more computers or servers, including peer-to-peer communications. Communication instructions 1554 may also be used to select an operational mode or communication medium for use by the device, based on a geographic location (obtained by the GPS/Navigation instructions 1568) of the device.

Memory 1550 may include graphical user interface instructions 1556 to facilitate graphic user interface processing, including a touch model for interpreting touch inputs and gestures; sensor processing instructions 1558 to facilitate sensor-related processing and functions; phone instructions 1560 to facilitate phone-related processes and functions; electronic messaging instructions 1562 to facilitate electronic-messaging related processes and functions; web browsing instructions 1564 to facilitate web browsing-related processes and functions; media processing instructions 1566 to facilitate media processing-related processes and functions; GPS/Navigation instructions 1568 to facilitate GPS and navigation-related processes and functions; camera instructions 1570 to facilitate camera-related processes and functions; and other instructions 1572 for implementing the features and processes, as described in reference to FIGS. 1-14.

Each of the above identified instructions and applications may correspond to a set of instructions for performing one or more functions described above. These instructions need not be implemented as separate software programs, procedures, or modules. Memory 1550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a computing device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:
   receiving, at a computer system, a location database regarding a plurality of points of interest, the database comprising, for each point of interest:
   a respective geographical boundary associated with the point of interest,
   a respective location fingerprint associated with the point of interest, and
   a respective label associated with the point of interest;
   determining, by the computer system, that a first location fingerprint associated with a first point of interest is similar to a second location fingerprint associated with a second point of interest; and
   responsive to determining that the first location fingerprint is similar to the second location fingerprint, modifying at least one of a first geographical boundary associated with the first point of interest or a second geographical boundary associated with the second point of interest in the location database, the modifying comprising merging the first point of interest and the second point of interest into a common point of interest having a common geographical boundary.

2. The method of claim 1, wherein the common geographical boundary encloses a geographical area enclosed by at least one of the first geographical boundary or the second geographical boundary.

3. The method of claim 1, further comprising:
determining a common location fingerprint based on the first location fingerprint and the second location fingerprint, and
associating the common location fingerprint with the common point of interest in the location database.

4. The method of claim 1, further comprising:
receiving, by the computer system, a query from a mobile device remote from the computer system, the query comprising an indication of a location of the mobile device, and an environmental measurement obtained by the mobile device at the location;
identifying, by the computer system, a set of candidate points of interest among the plurality of points of interest in geographical proximity to the location; and
determining, by the computer system, a similarity between the environmental measurement and each location fingerprint of the set.

5. The method of claim 4, further comprising:
selecting, by the computer system, a particular candidate point of interest from among the set, wherein the particular candidate point of interest is selected based on the similarity between the environmental measurement and each location fingerprint of the set;
associating, by the computer system, the label of the selected point of interest with the location; and
transmitting, from the computer system to the mobile device, the label of the selected point of interest.

6. The method of claim 5, further comprising:
determining, by the computer system, a likelihood that the location is associated with each candidate point of interest of the set based on the similarity between the environmental measurement and each location fingerprint of the set.

7. The method of claim 6, further comprising:
determining, by the computer system, that a first likelihood that the location is associated with a first candidate location is substantially equal to a second likelihood that the location is associated with a second candidate location, and
responsive to determining that the first likelihood and the second likelihood are substantially equal, modifying at least one of the geographical boundary of the first candidate location or the geographical boundary of the second candidate location in the location database.

8. The method of claim 7, wherein modifying at least one of the geographical boundary of the first candidate location or the geographical boundary of the second candidate location comprises:
modifying at least one of the geographical boundary of the first candidate location or the geographical boundary of the second candidate location to pass through the location.

9. One or more non-transitory computer-readable media including one or more sequences of instructions which, when executed by one or more processors, causes:
receiving, at a computer system, a location database regarding a plurality of points of interest, the database comprising, for each point of interest:
a respective geographical boundary associated with the point of interest,
a respective location fingerprint associated with the point of interest, and
a respective label associated with the point of interest;
determining, by the computer system, that a first location fingerprint associated with a first point of interest is similar to a second location fingerprint associated with a second point of interest; and
responsive to determining that the first location fingerprint is similar to the second location fingerprint, modifying at least one of a first geographical boundary associated with the first point of interest or a second geographical boundary associated with the second point of interest in the location database, the modifying comprising merging the first point of interest and the second point of interest into a common point of interest having a common geographical boundary.

10. The one or more non-transitory computer-readable media of claim 9, wherein the common geographical boundary encloses a geographical area enclosed by at least one of the first geographical boundary or the second geographical boundary.

11. The one or more non-transitory computer-readable media of claim 9, further comprising:
determining a common location fingerprint based on the first location fingerprint and the second location fingerprint, and
associating the common location fingerprint with the common point of interest in the location database.

12. The one or more non-transitory computer-readable media of claim 9, further comprising:
receiving, by the computer system, a query from a mobile device remote from the computer system, the query comprising an indication of a location of the mobile device, and an environmental measurement obtained by the mobile device at the location;
identifying, by the computer system, a set of candidate points of interest among the plurality of points of interest in geographical proximity to the location; and
determining, by the computer system, a similarity between the environmental measurement and each location fingerprint of the set.

13. The one or more non-transitory computer-readable media of claim 12, further comprising:
selecting, by the computer system, a particular candidate point of interest from among the set, wherein the particular candidate point of interest is selected based on the similarity between the environmental measurement and each location fingerprint of the set;
associating, by the computer system, the label of the selected point of interest with the location; and
transmitting, from the computer system to the mobile device, the label of the selected point of interest.

14. The one or more non-transitory computer-readable media of claim 13, further comprising:
determining, by the computer system, a likelihood that the location is associated with each candidate point of interest of the set based on the similarity between the environmental measurement and each location fingerprint of the set.

15. The one or more non-transitory computer-readable media of claim 14, further comprising:
determining, by the computer system, that a first likelihood that the location is associated with a first candidate location is substantially equal to a second likelihood that the location is associated with a second candidate location, and
responsive to determining that the first likelihood and the second likelihood are substantially equal, modifying at least one of the geographical boundary of the first candidate location or the geographical boundary of the second candidate location in the location database.

16. The one or more non-transitory computer-readable media of claim 15, wherein modifying at least one of the geographical boundary of the first candidate location or the geographical boundary of the second candidate location comprises:
   modifying at least one of the geographical boundary of the first candidate location or the geographical boundary of the second candidate location to pass through the location.

17. A system comprising:
   one or more processors; and
   one or more non-transitory computer-readable media including one or more sequences of instructions which, when executed by the one or more processors, causes:
      receiving, at a computer system, a location database regarding a plurality of points of interest, the database comprising, for each point of interest:
         a respective geographical boundary associated with the point of interest,
         a respective location fingerprint associated with the point of interest, and
         a respective label associated with the point of interest;
      determining, by the computer system, that a first location fingerprint associated with a first point of interest is similar to a second location fingerprint associated with a second point of interest; and
      responsive to determining that the first location fingerprint is similar to the second location fingerprint, modifying at least one of a first geographical boundary associated with the first point of interest or a second geographical boundary associated with the second point of interest in the location database, the modifying comprising merging the first point of interest and the second point of interest into a common point of interest having a common geographical boundary.

18. The system of claim 17, wherein the common geographical boundary encloses a geographical area enclosed by at least one of the first geographical boundary or the second geographical boundary.

19. The system of claim 17, the one or more sequences of instructions which, when executed by the one or more processors, further cause:
   determining a common location fingerprint based on the first location fingerprint and the second location fingerprint, and
   associating the common location fingerprint with the common point of interest in the location database.

20. The system of claim 17, the one or more sequences of instructions which, when executed by the one or more processors, further cause:
   receiving, by the computer system, a query from a mobile device remote from the computer system, the query comprising an indication of a location of the mobile device, and an environmental measurement obtained by the mobile device at the location;
   identifying, by the computer system, a set of candidate points of interest among the plurality of points of interest in geographical proximity to the location; and
   determining, by the computer system, a similarity between the environmental measurement and each location fingerprint of the set.

* * * * *